US009327827B2

(12) United States Patent
Moser et al.

(10) Patent No.: US 9,327,827 B2
(45) Date of Patent: May 3, 2016

(54) LEADING AND TRAILING EDGE DEVICE DEFLECTIONS DURING DESCENT OF AN AIRCRAFT

(71) Applicant: The Boeing Company, Chicago, IL (US)

(72) Inventors: Matthew A. Moser, Marysville, WA (US); Benjamin M. Liu, Bothell, WA (US); Michael R. Finn, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 165 days.

(21) Appl. No.: 14/035,001

(22) Filed: Sep. 24, 2013

(65) Prior Publication Data

US 2015/0083851 A1 Mar. 26, 2015

(51) Int. Cl.

| | |
|---|---|
| ***B64C 13/00*** | (2006.01) |
| ***B64C 13/16*** | (2006.01) |
| ***B64C 9/32*** | (2006.01) |
| ***B64C 19/02*** | (2006.01) |
| ***G05D 1/06*** | (2006.01) |

(52) U.S. Cl.

CPC . *B64C 13/16* (2013.01); *B64C 9/32* (2013.01); *B64C 19/02* (2013.01); *G05D 1/0607* (2013.01); *Y02T 50/32* (2013.01)

(58) Field of Classification Search

CPC ........ B64C 13/16; B64C 13/24; B64C 13/50; B64C 9/14–9/25

USPC .......................................... 244/234, 221, 228

See application file for complete search history.

(56) References Cited

U.S. PATENT DOCUMENTS

| | | | |
|---|---|---|---|
| 2,350,751 | A | 6/1944 | Spitzer |
| 3,822,047 | A | 7/1974 | Schuldt, Jr. |
| 4,725,026 | A | 2/1988 | Krafka et al. |

(Continued)

FOREIGN PATENT DOCUMENTS

| | | |
|---|---|---|
| EP | 0193442 | 9/1986 |
| EP | 1547917 A1 | 6/2005 |

(Continued)

OTHER PUBLICATIONS

Brady, C. (1999). Flight Controls. Retrieved Oct. 8, 2015, from b737: http://www.b737.org.uk/flightcontrols.htm.*

(Continued)

*Primary Examiner* — Tien Dinh
*Assistant Examiner* — Aaron Rodziwicz

(57) ABSTRACT

An system for increasing the descent rate of an aircraft may include a flight control computer, an edge control system, and a speedbrake control device. The flight control computer may be configured to compute a first setting for a leading edge device and/or a trailing edge device of an aircraft wing. The edge control system may be communicatively coupled to the flight control computer and may include an edge control device having a plurality of control device positions including a cruise position. The speedbrake control device may include a plurality of speedbrake detents including a flight detent. The edge control system may be configured to automatically command the leading edge device, the trailing edge device, or both, to a deflection angle corresponding to the first setting if the edge control device is in the cruise position and the speedbrake control device is in the flight detent.

12 Claims, 16 Drawing Sheets

116 132 118 120 300 134 152 246 112 130 100 102 103 128 244 114 105 110 244 144 286 108 154 246 242 104 156 240 152 288 150 146

(56) References Cited

U.S. PATENT DOCUMENTS

| | | | |
|---|---|---|---|
| 4,729,528 | A | 3/1988 | Borzachillo |
| 4,821,981 | A | 4/1989 | Gangsaas et al. |
| 4,838,503 | A | 6/1989 | Williams |
| 5,056,741 | A | 10/1991 | Bliesner |
| 5,839,699 | A | 11/1998 | Bliesner |
| 6,152,405 | A | 11/2000 | Muller |
| 6,507,776 | B1 | 1/2003 | Fox, III |
| 6,913,228 | B2 | 7/2005 | Lee |
| 7,494,094 | B2 | 2/2009 | Good et al. |
| 7,556,224 | B2 * | 7/2009 | Johnson .................. B64C 13/50 244/175 |
| 7,641,152 | B2 | 1/2010 | Onu et al. |
| 7,726,610 | B2 | 6/2010 | Good et al. |
| 7,792,615 | B2 | 9/2010 | Aimar |
| 8,356,766 | B2 | 1/2013 | Garthaffner |
| 8,424,810 | B1 | 4/2013 | Shmilovich et al. |
| 8,954,208 | B2 | 2/2015 | Yamasaki |
| 2005/0011994 | A1 | 1/2005 | Sakurai et al. |
| 2005/0151028 | A1 | 7/2005 | Pohl |
| 2006/0049308 | A1 | 3/2006 | Good et al. |
| 2009/0228161 | A1 | 9/2009 | Botargues et al. |
| 2009/0314897 | A1 | 12/2009 | Boissenin et al. |
| 2010/0200704 | A1 | 8/2010 | Berens et al. |
| 2011/0127385 | A1 | 6/2011 | Morris |
| 2011/0251739 | A1 * | 10/2011 | Tomas .................. B64C 13/503 701/3 |
| 2012/0022723 | A1 | 1/2012 | Botargues et al. |
| 2012/0032030 | A1 | 2/2012 | Ruckes et al. |

FOREIGN PATENT DOCUMENTS

| | | |
|---|---|---|
| EP | 2465770 | 6/2012 |
| FR | 2902756 | 12/2007 |
| GB | 2186849 | 8/1987 |
| WO | W09915403 | 4/1999 |

OTHER PUBLICATIONS

Flight Idle and Flight Detent . (1996). Retrieved Oct. 8, 2015, from Flight Sim: http://www.flightsim.com/vbfs/showthread.php?291315-Flight-Idle-and-Flight-Detent.*

European Search Report for 14186027.0, dated Feb. 9, 2015.

Airbus, "Getting to Grips with Aircraft Performance," Jan. 2002.

Delta Virtual Airlines, "Boeing 777-200ER Aircraft Operating Manual," Nov. 2005.

The Boeing Company, "777 Flight Crew Operations Manual—Flight Controls," Dec. 15, 2003.2008.

Smart Cockpit, "B737-Emergency_Descent," retrieved Aug. 9. 2013.

* cited by examiner

300
TO VCTUs
TO INBOARD DEVICES
CONTROLLER
422
424
402
294
LE PDU
TORQUE BRAKE
TORQUE BRAKE
LIMIT SWITCH
GEAR BOX
412
STANDBY
ACTIVE
AC ELECTRIC MOTOR UNIT
406
HYDRAULIC MOTOR
406
410
408
CENTRAL BRAKE
414
400
420
CENTRAL HYDRAULIC SYSTEM
418
POWER SUPPLY
426
428
404
TE PDU 306
332
324
302
326
332
314
334
324
320

LEADING AND TRAILING EDGE DEVICE DEFLECTIONS DURING DESCENT OF AN AIRCRAFT

FIELD

The present disclosure relates generally to flight controls and, more particularly, to the operation of control surfaces during a descent of an aircraft, such as an emergency descent.

BACKGROUND

Aircraft such as commercial airliners typically include control surfaces or devices mounted on the wings to improve the aerodynamic performance of the aircraft. Such control surfaces include wing leading edge devices and wing trailing edge devices which may be extended and/or deflected during different phases of flight to alter the lift and/or drag characteristics of the wings. For example, commercial airliners typically include leading edge slats and trailing edge flaps which may be extended during takeoff, approach, landing, and/or during other flight phases to increase the area and camber of the wings to increase the wing lift characteristics.

Aircraft regulatory bodies such as the Federal Aviation Administration require that aircraft meet minimum performance standards during different phases of flight and during emergency situations. For an aircraft traveling at a cruising altitude, rapid decompression of the cabin of an aircraft is a type of emergency situation requiring immediate and rapid descent, typically referred to as an emergency descent, of the aircraft from a relatively high cruising altitude to a lower safe altitude. The time period during which the aircraft must descend to the lower safe altitude is dictated by Federal Aviation Regulation (FAR) 25.841 which specifies cabin pressurization requirements for aircraft certification. For example, FAR 25.841(a)(2) specifies that an aircraft must be designed such that occupants will not be exposed to a cabin pressure altitude that exceeds the following after decompression from any failure condition not shown to be extremely improbable: 25,000 feet for more than two (2) minutes, or 40,000 feet for any duration.

Typically, during an emergency descent, the engine throttles may be reduced to idle and the nose of the aircraft may be pitched over so that the aircraft may descend at its maximum operating speed until reaching the lower altitude. To meet the requirements of FAR 25.841, aircraft traditionally deploy existing spoilers on the wings to reduce wing lift and increase drag to maximize the rate of descent. Deployment of the spoilers in conventional aircraft may be insufficient to achieve a desired and/or required (e.g., as per the requirements of FAR 25.841) descent rate, which may necessitate an increase in the surface area of the spoilers and/or an increase in spoiler deflections. An increase in the surface area or deflection angle of the spoilers may result in an increase in the weight of the aircraft and/or an increase in spoiler actuation capacity which may lead to a sub-optimal wing configuration, or may cause excessive aerodynamic/structure buffet.

SUMMARY

The present disclosure is directed toward a system for increasing a descent rate of an aircraft, which may also be referred to herein as emergency descent system. The emergency descent system may include a flight control computer, an edge control system, and a speedbrake control device. The flight control computer may be configured to compute a first setting for a leading edge device and/or a trailing edge device of an aircraft wing. The edge control system may be communicatively coupled to the flight control computer and may include an edge control device having a plurality of control device positions including a cruise position. The speedbrake control device may include a plurality of speedbrake detents including a flight detent. The edge control system may be configured to automatically command the leading edge device, the trailing edge device, or both, to a deflection angle corresponding to the first setting if the edge control device is in the cruise position and the speedbrake control device is in the flight detent.

Also disclosed is an aircraft having a pair of wings including a leading edge device, a trailing edges device, or both. The aircraft may further include an emergency descent system for increasing the descent rate of the aircraft. The emergency descent system may include a flight control computer, an edge control system, and a speedbrake control device. The flight control computer may be configured to receive an indication of loss of cabin pressure and compute a first setting for the leading edge device and/or the trailing edge device. The edge control system may be communicatively coupled to the flight control computer and may be operable to control the leading edge device and/or the trailing edges device. The speedbrake control device may include a plurality of speedbrake detents including a flight detent. The emergency descent system may be configured to automatically command the leading edge device and/or the trailing edge device to a deflection angle corresponding to the first setting responsive, at least in part, to the indication of loss of cabin pressure and selection, with the speedbrake control device, of the flight detent.

Also disclosed is a method for increasing a descent rate of an aircraft. The method may include computing a maximum drag setting for at least one of a leading edge device and a trailing edge device of an aircraft. The method may additionally include positioning an edge control device of the aircraft in a first position, and moving a speedbrake control device of the aircraft to a second position. If the edge control device is in the first position, the method may include automatically commanding the at least one of the leading edge device and the trailing edge device to a deflection angle corresponding to the maximum drag setting in response to moving the speedbrake control device to the second position.

BRIEF DESCRIPTION OF THE DRAWINGS

These and other features of the present disclosure will become more apparent upon reference to the drawings wherein like numbers refer to like parts throughout and wherein.

DETAILED DESCRIPTION

Figure 1:
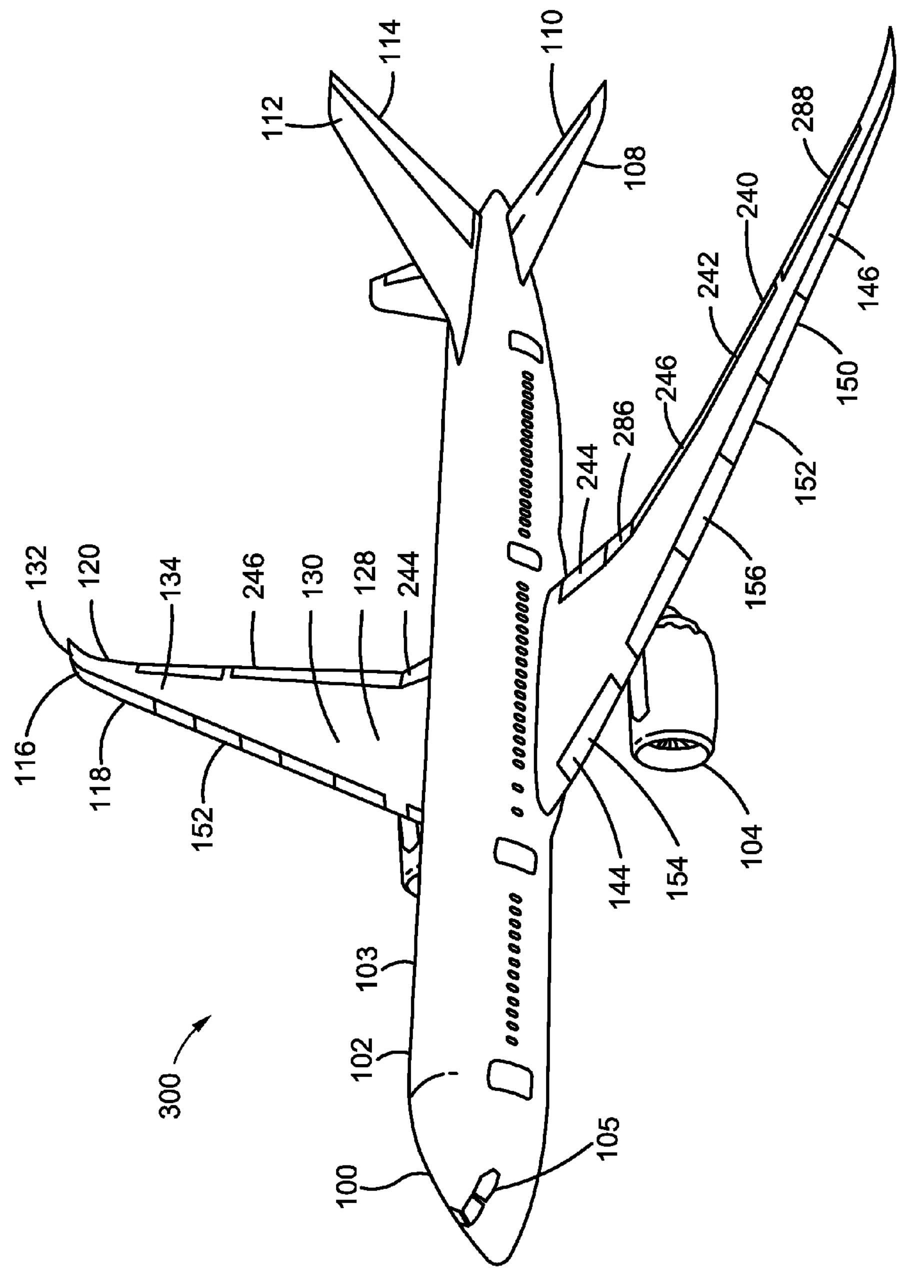
FIG. 1 is a perspective illustration aircraft.

The drawings are provided for purposes of illustrating various embodiments and facilitating an understanding of the present disclosure and it will be understood that the various embodiments depicted therein may or may not be to scale. Referring now to the drawings, shown in FIG. 1 is an embodiment of an aircraft 100 having a fuselage 102 and a pair of wings 116. The fuselage 102 may include a flight deck 105 at the forward end of the fuselage 102 and a cabin 103 located aft of the flight deck 105. The aircraft 100 may include a pair of wings 116. Each wing 116 may be attached to the fuselage 102 at a wing root 128 and may extend from an inboard portion 130 toward an outboard portion 134 and terminating at a wing tip 132. The aircraft 100 may include one or more propulsion units 104 which may be mounted on the wings 116. The aircraft 100 may further include an empennage which may include a horizontal tail 108 and elevator 110, and a vertical tail 112 and rudder 114 for directional control of the aircraft 100. The wings 116 may include one or more leading edge devices 150, one or more trailing edge devices 240, and one or more spoilers 290 (FIG. 2) which may be deflected to alter the lift characteristics and/or drag characteristics of the wings 116.

Figure 4:
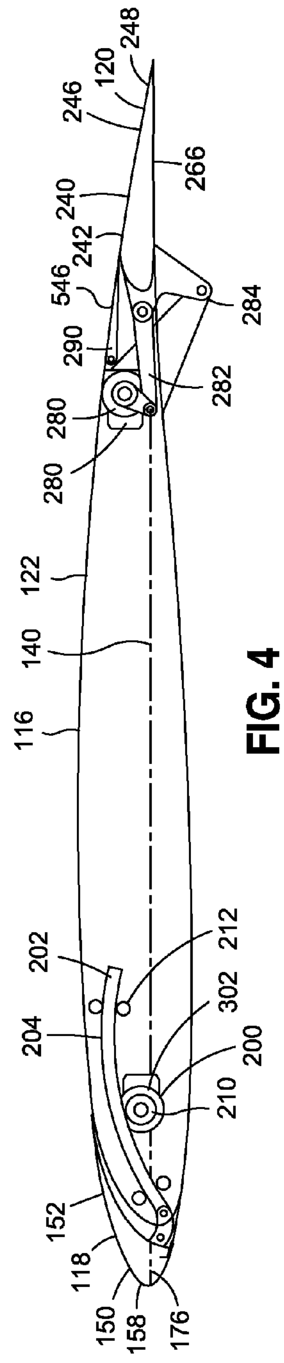
FIG. 4 is a sectional view of the wing of an aircraft during high altitude cruise flight.
Figure 5:
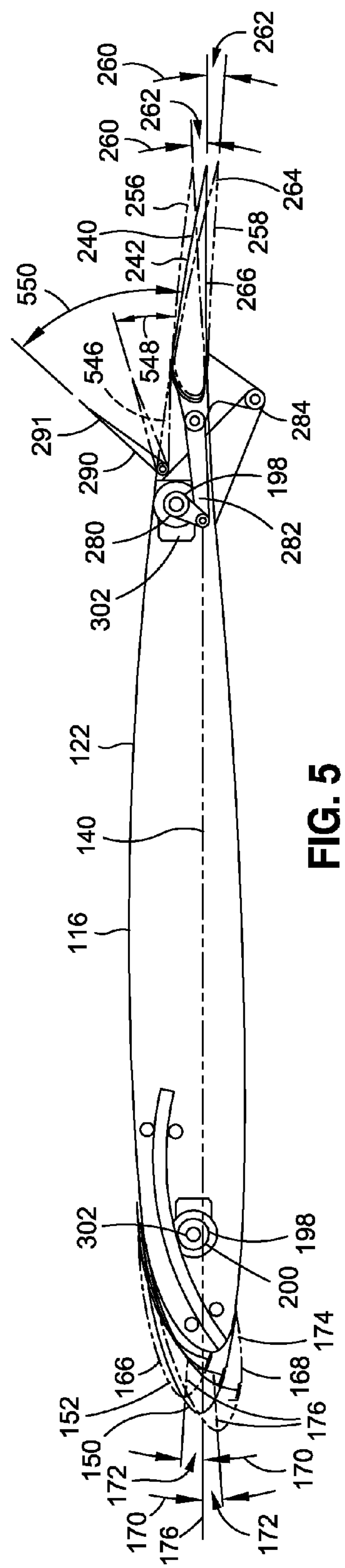
FIG. 5 is a sectional view of the wing during an emergency descent illustrating a spoiler actuated into an augmented deployment angle and further illustrating upward and downward deflection of the slat and the flap in relatively small deflection angles in a variable camber mode.
Figure 6:
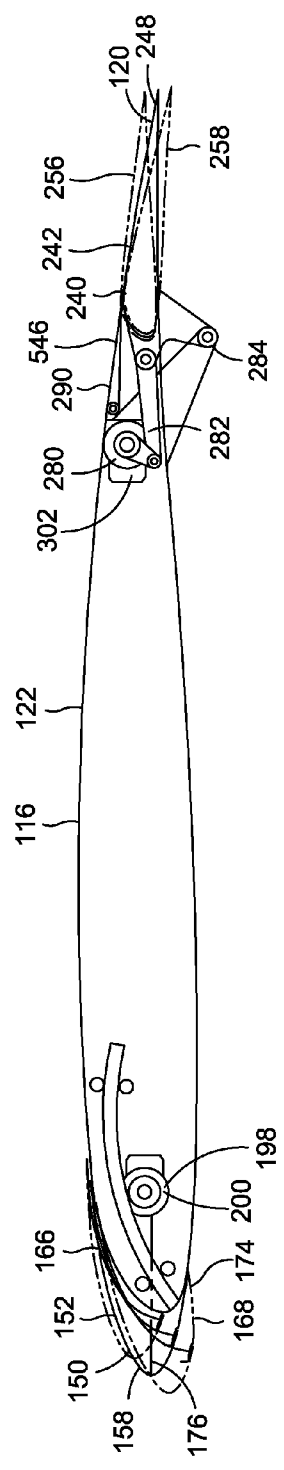
FIG. 6 is a sectional view of the wing of the aircraft during low altitude cruise flight following the emergency descent and illustrating the actuation of the slat and flap in a variable camber drag reduction mode.

An emergency descent procedure according to some examples of the present disclosure is described to facilitate an understanding of the present disclosure. During cruise flight (e.g., as shown by flight segment 574 in FIG. 19), the aircraft 100 may initially be flying at a cruising altitude and at a cruise speed. For example, the aircraft 100 may be flying at a cruising altitude of approximately 30,000 to 45,000 feet or higher, depending on the particular aircraft. The cruising altitude may, but need not be, the maximum certified altitude for the aircraft. The aircraft 100 may be moving at a cruise speed which may be selected for optimum fuel efficiency. In an embodiment, the cruise speed may be in the range of approximately Mach 0.75 to 0.82 or higher, depending upon aircraft gross weight, air temperature, air pressure, and other factors. The leading edge devices 150 and trailing edge devices 240 of the wing 116 may optionally be in a retracted position 158, 248, e.g., as shown in FIG. 4. In some examples, the leading edge and trailing edge devices 150, 240 may be operated in a variable camber mode, e.g., as shown in FIGS. 5-6 and described in further detail below. During cruise flight, the cabin 103 may be maintained at a predetermined pressure altitude. For example, the cabin 103 may be maintained at a maximum pressure altitude of approximately 8,000 feet above sea level.

Figure 19:
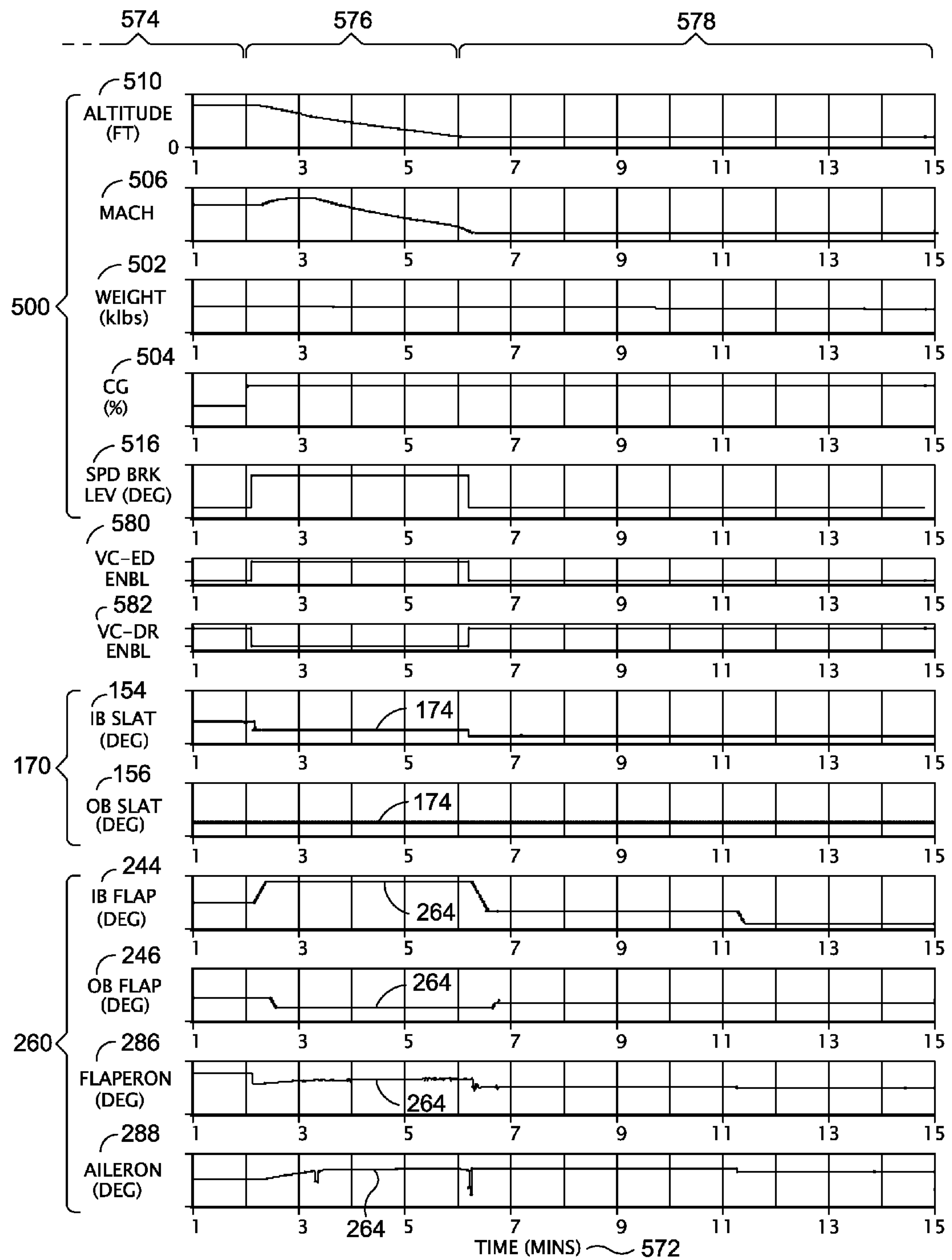
FIG. 19 shows several graphs illustrating the functionality of the system during an emergency descent and the differential deployment of the inner and outer leading edge and trailing edge devices as a function of the aircraft gross weight, aircraft center of gravity, Mach number, and altitude.

In the event of a certain occurrence and/or condition, the pilot may initiate an emergency descent (e.g., as shown by flight segment 576 in FIG. 19). For example, the aircraft 100 may be operable to descend from a cruising altitude, which may be a relatively high altitude (e.g., 40,000 feet) to a relatively low altitude (e.g., 10,000 feet) upon the occurrence of an emergency situation such as a sudden loss of cabin pressure. As described in greater detail below, in the event of a sudden cabin depressurization or decompression, an aural, visual, and/or tactile indication of cabin depressurization may be provided to the flight crew. For example, an indication of cabin depressurization may be provided when the normal cabin pressure altitude exceeds a predetermined limit (e.g., 8,000 feet). Upon receiving the indication of cabin depressurization, supplemental oxygen may be provided to the flight crew such as by the flight crew donning oxygen masks. In some examples, the aircraft 100 may include an emergency descent system 300 for increasing a descent rate of the aircraft.

Figure 2:
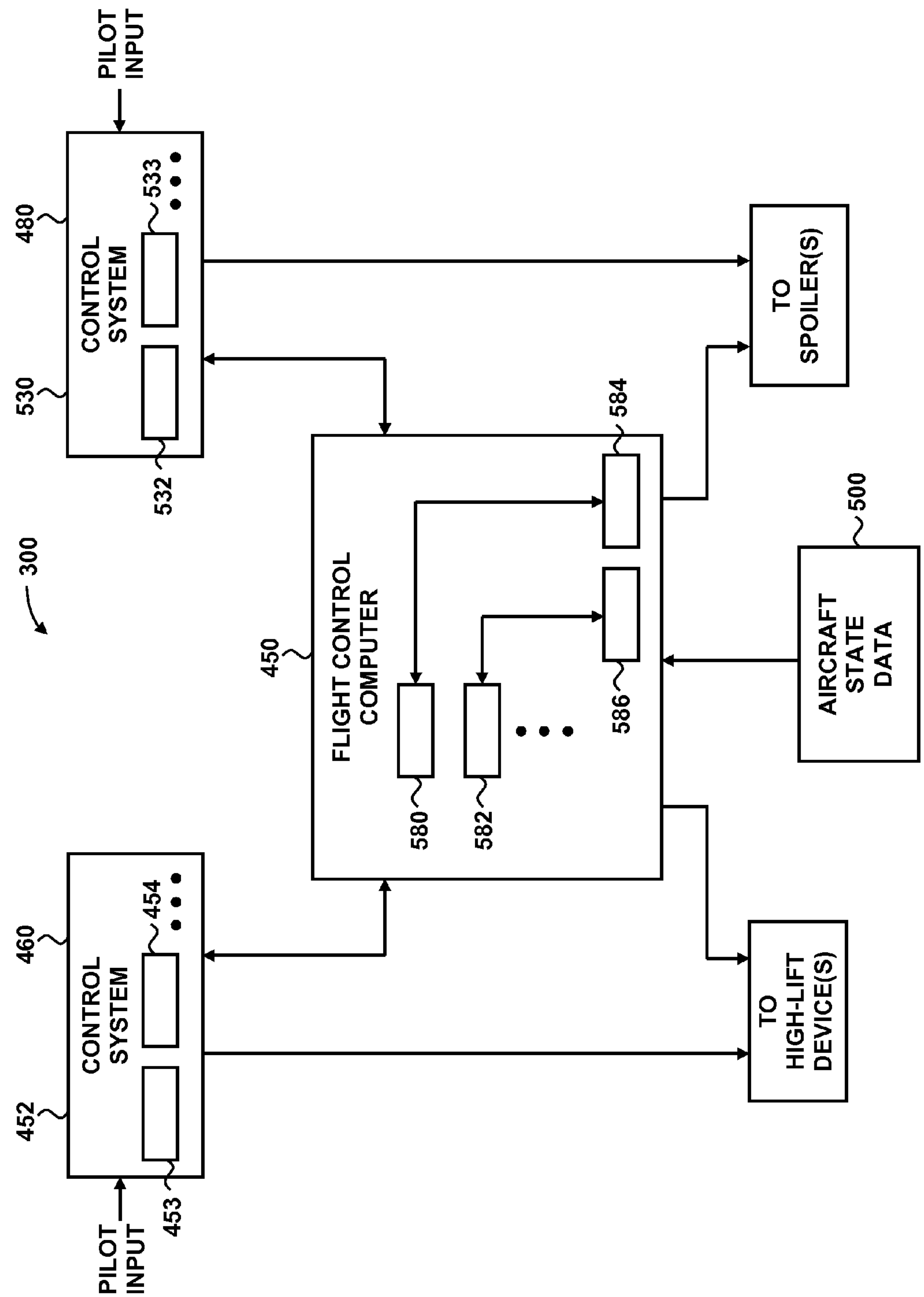
FIG. 2 is a block diagram of an emergency descent system according to the present disclosure.

FIG. 2 shows a block diagram of an emergency descent system 300 according to some examples of the present disclosure. The emergency descent system 300 may be configured to automatically command movement of one or more high-lift devices (e.g., leading edge devices 150 and/or trailing edge devices 240) of the aircraft 100, for example to increase a descent rate of the aircraft 100 and/or facilitate an emergency descent of the aircraft 100 from a first altitude (e.g., the relatively high altitude or high cruise altitude) to a second altitude (e.g., the relatively low altitude or low cruise altitude). By "automatic" or "automatically," it is meant in the context of the present application that the action (e.g., command, control, movement, deployment, extension, etc.) occurs or is performed without manual input (e.g., from the flight crew or other operator). The emergency descent system 300 may include a flight control computer 450 which may be part of and/or integrated with a flight control system of the aircraft 100. The flight control computer 450 may include a plurality of operational modes, which may also be referred to herein as variable camber modes. In some embodiments, the flight control computer may include a first mode and a second mode.

The flight control computer 450 may be configured to compute a first setting 584 for the leading and/or trailing edge devices 150, 240 when the flight control computer 450 is in the first mode, and may be further configured to compute a second setting 586 for the leading and/or trailing edge devices 150, 240 when the flight control computer 450 is in the second mode. For example, the first mode may be an emergency descent mode 580 (see also FIG. 18) and the first setting 584 may correspond to one or more deflections for the leading and/or trailing edge devices 150, 240 selected to increase aerodynamic drag. The first setting 584 may be a maximum drag setting, e.g., a maximum drag setting 174, 264 for the leading edge devices 150 and/or the trailing edge devices 240, respectively. The second mode may be a drag reduction mode 582 (see also FIG. 18) and the second setting 586 may correspond to one or more deflections for the leading and/or trailing edge devices 150, 240 selected to reduce aerodynamic drag. Deflections of the leading and/or trailing edge devices 150, 240 corresponding to the first and/or second settings 584, 586 may include small deflection angles or increments, for example in the order of 1 degree to 4 degrees. Improved tailoring of the drag characteristics of the wing 116 may be achieved by deployment of the leading edge and/or trailing edge devices 150, 240 in small deflection angles or increments, e.g., deflection angles which are smaller than deflection angles associated with standard flap/slat settings.

The emergency descent system 300 may further include a first control system 460 which may be operable to command movement of one or more leading edge devices 150 and/or one or more trailing edge devices 240. The first control system 460 may interchangeably be referred to as a high-lift control system. As described herein, the trailing edge devices 240 may, without limitation, include flaps 242 and/or flaperons 286 and the leading edge devices 150 may, without limitation, include slats 152. The first control system 460 may be implemented as an edge control system 452, which will be described in further detail with reference to FIG. 18. For example, the first control system 460 may include an edge control device 453, such as a flap control lever 454 (see e.g., FIG. 18), which may enable the flight crew to manually command a position of the leading and/or trailing edge devices 150, 240.

The emergency descent system 300 may also include a second control system 480, which may be operable to command deployment of certain trailing edge devices, for example the one or more spoilers 290. In this regard, the second control system 480 may also be referred to as spoiler or speedbrake control system 530. The speedbrake control system 530 may include a speedbrake control device 532, which may be implemented, without limitation, as a speedbrake lever 534 (see e.g., FIG. 18). The speedbrake lever 534 may be positionable in any one of a plurality of speedbrake lever positions or detents 536 including a flight detent position 542. The flight crew and/or the flight control system of the aircraft 100 may move the speedbrake lever 534 to the flight detent position 542 (e.g., from a down detent position 538) to deploy one or more of the spoilers 290.

Deployment of the spoilers 290 may cause a nose-down pitching moment of the aircraft 100 and may initiate a descent of the aircraft 100, which may be performed in some cases while maintaining the aircraft 100 at a maximum operating speed for the given aircraft configuration. The emergency descent system 300 may be configured to automatically command one or more of the leading edge devices 150 and/or trailing edges devices 240 to be extended or deflected to relatively small deflection angles 170, 260 (FIG. 5), for example to increase aerodynamic drag of the wings 116 (e.g., reduce the lift-to-drag ratio) and thereby increase the descent rate of the aircraft 100 as described below. In some examples, the emergency descent system 300 may be configured to deploy one or more of the leading edge devices 150 and/or trailing edges devices 240 in conjunction with deployment of the spoilers 290 to increase aerodynamic drag and thereby increase a descent rate of the aircraft 100.

Figure 18:
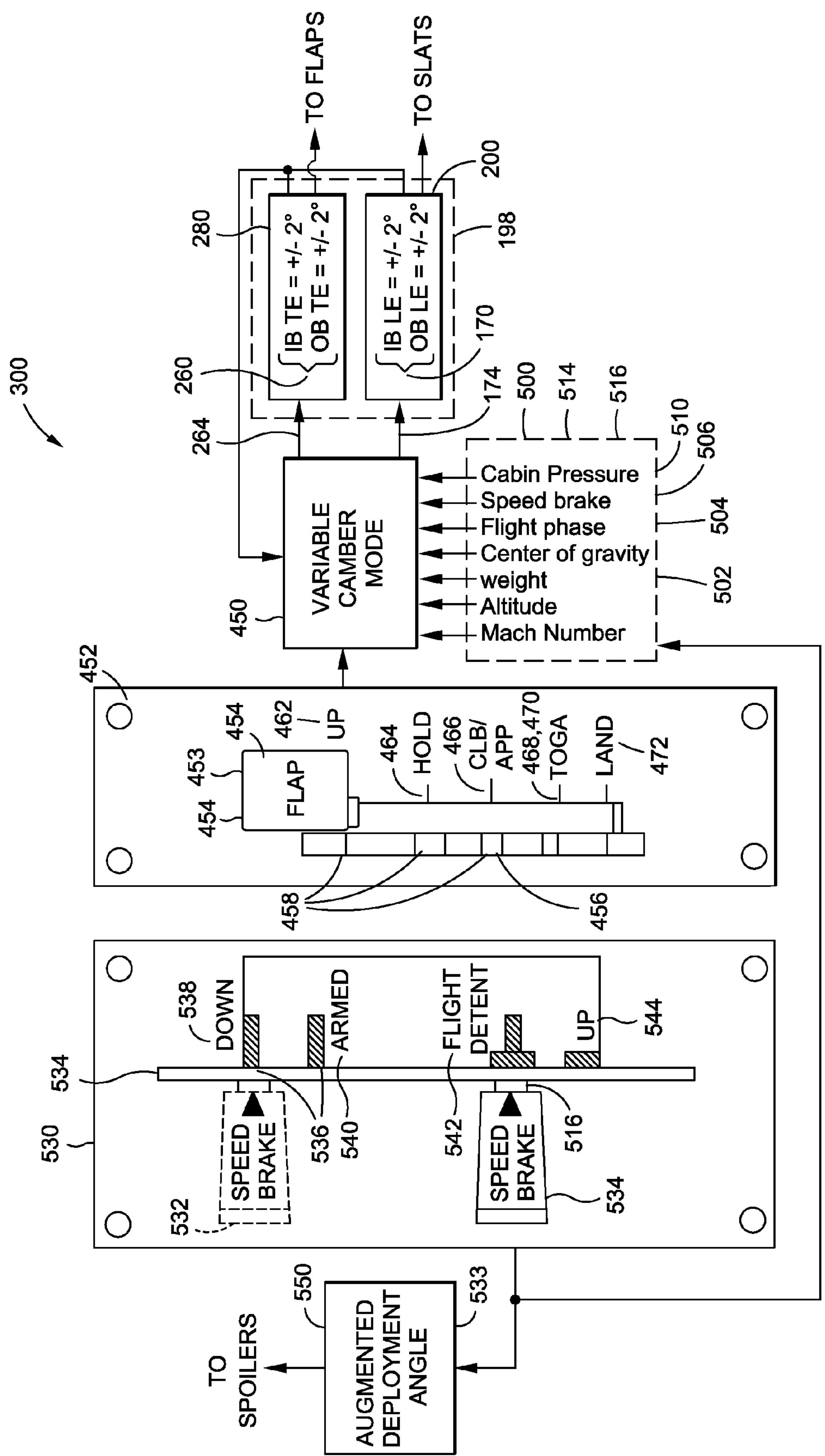
FIG. 18 is a diagrammatic view of an embodiment of a speedbrake control system and an edge control system for respectively controlling the spoilers and the leading edge and trailing edge devices in a variable camber mode during an emergency descent based on a maximum drag setting computed by a flight control computer based on aircraft state data.

As the aircraft 100 approaches a predetermined altitude (e.g., the relatively low altitude), the aircraft 100 may be operable to level-off responsive to a reduction in the pitch attitude of the aircraft 100. The system 300 may be operable to control the spoilers 290, which may be retracted responsive to moving the speedbrake lever 534 (FIG. 18) from the flight detent 542 (FIG. 18) to a down detent 538 (FIG. 18). In addition, as shown in FIG. 6, the leading edge and/or trailing edge devices 150, 240 may be operable in a variable camber mode, during which one or more of the leading edge and/or trailing edge devices 150, 240 may be deflected to relatively small deflection angles 170, 260 (FIG. 5), which may minimize aerodynamic drag to conserve fuel while the aircraft 100 is diverted to an airport. By relatively small deflection angels, it is implied that the one or more of the leading edge and/or trailing edge devices 150, 240 are deflected in deflection or angle increments which may be smaller than the deflection or angle increment associated with a standard flap detent.

Figure 3:
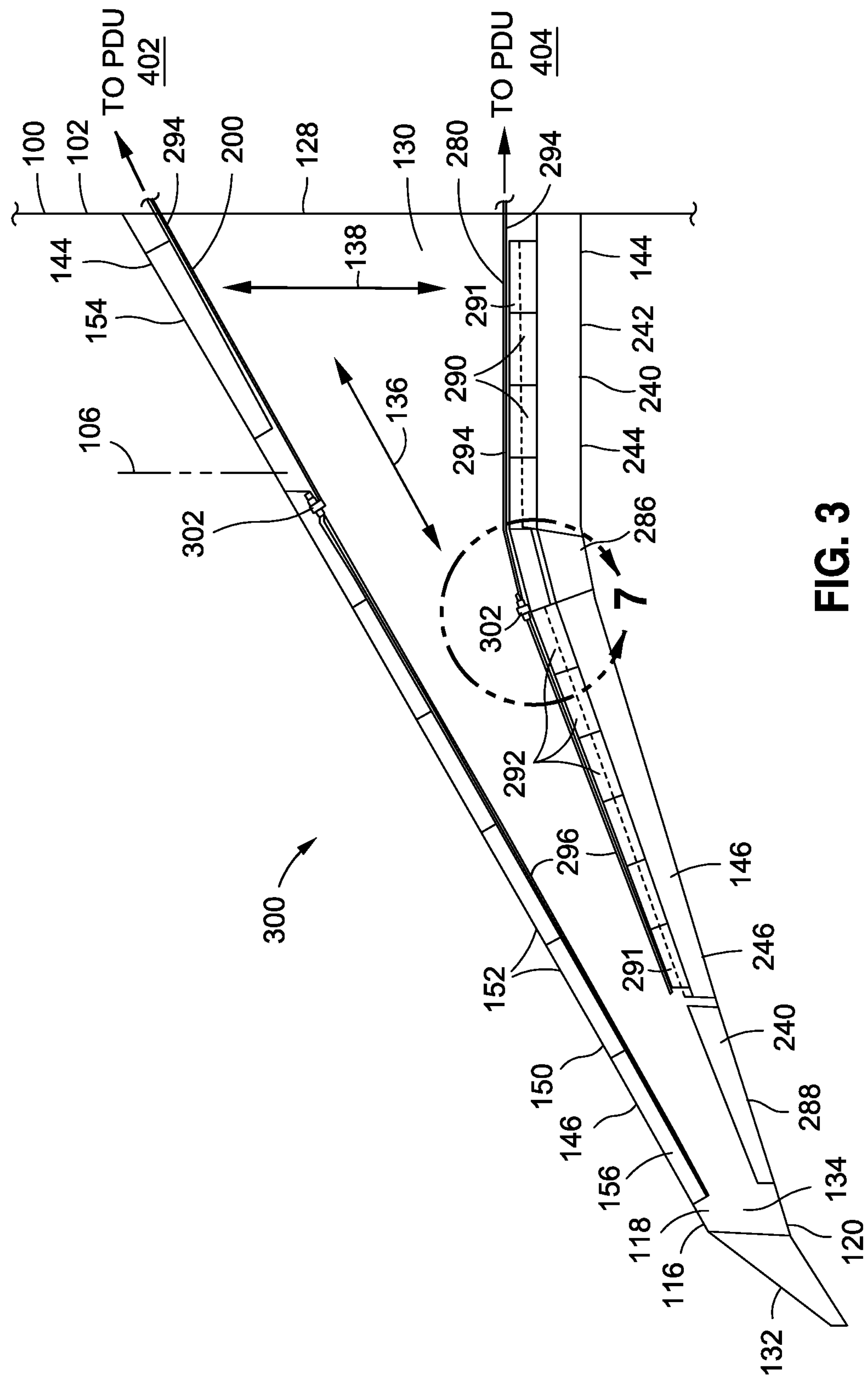
FIG. 3 is a top view of a wing of the aircraft.

In FIG. 3, shown is an embodiment of an aircraft wing 116 having one or more leading edge devices 150 and one or more trailing edge device 240 respectively mounted to the leading edge 118 and trailing edge 120 of the wing 116. The leading edge devices 150 may be configured as slats 152, Krueger flaps, or other leading edge device 150 configurations. The slats 152 may include one or more inboard slats 154 and one or more outboard slats 156. In an embodiment, the propulsion unit centerline 106 may be the dividing line between the inboard devices 144 in the outboard devices 146. However, any point along a spanwise direction 136 of the wing 116 may be the dividing line between the inboard devices 144 and the outboard devices 146.

In FIG. 3, the trailing edge devices 240 may also include inboard devices 144 and outboard devices 146. The inboard devices 144 may include one or more inboard flaps 244, and an inboard roll-control flap device such as a flaperon 286. The outboard devices 146 may also include one or more outboard flaps 246, and an outboard roll-control device such as an aileron 288. However, the trailing edge devices 240 may be provided in alternative configurations including, but not limited to, elevons, and other trailing edge device configurations. The inboard devices 144 on the leading edge 118 and trailing edge 120 may be coupled to an inboard torque tube 294 or other mechanical linkage for actuating the inboard devices 144 by means of a device actuation system 198 (FIG. 5).

Figure 11:
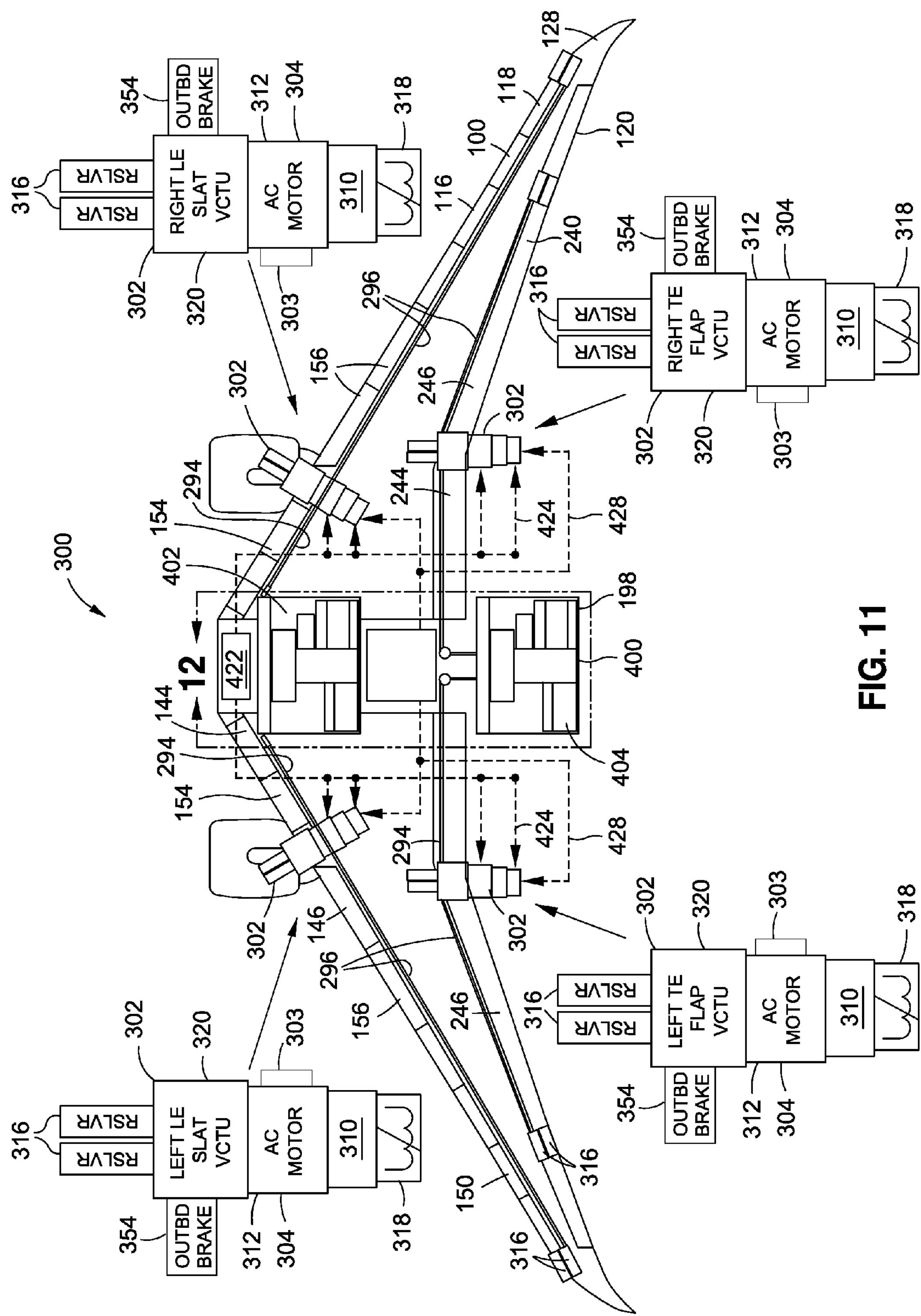
FIG. 11 is a diagrammatic plan view of a leading edge actuation system and a trailing edge actuation system each incorporating a VCTU between the inboard and outboard devices on the leading edge and trailing edge of each wing.

For example, in FIG. 3, the inboard torque tube 294 on the leading edge 118 and the inboard torque tube 294 on the trailing edge 120 may be respectively driven by a centrally-located leading edge power drive unit (PDU) 402 and a trailing edge power drive unit (PDU) 404 (see e.g., FIG. 11). The outboard devices 146 on the leading edge 118 and trailing edge 120 may be respectively coupled to an outboard torque tube 296 and/or other mechanical linkage for actuating the outboard devices 146. The device actuation systems 198 (FIG. 5) for the leading edge 118 and trailing edge devices 240 may be configured to actuate the inboard device 144 and the outboard device 146 independent of one another. Selective or differential actuation of one or more leading edge and/or trailing edge devices 150, 240 independently of other ones of the leading edge and/or trailing edge devices 150, 240 may allow for varying the camber of the wing 116 along a chordwise direction 138 and/or spanwise direction 136 of the wing 116, which may maximize aerodynamic drag of the wing 116 during an emergency descent 576 (FIG. 2) of the aircraft 100.

In FIG. 3, the wings 116 may include a motorized variable camber trim unit (VCTU) that may be positioned between an inboard device 144 and an outboard device 146. Each one of the VCTUs 302 may include a speed sum gearbox 320 (not shown) that may be located at the leading edge 118 of the aircraft wing 116 between the inboard slat 154 and the outboard slats 154. Similarly, the motorized VCTU 302 may be located at the trailing edge 120 between the inboard flaperon 286 or inboard flaps 244 and the outboard flaps 246. The VCTUs 302 may be operated in conjunction with the PDUs 400 (FIG. 11) to provide dynamic independent adjustment of the leading edge devices 150 and trailing edge devices 240 to vary the wing camber along a chordwise direction 138 and/or a spanwise direction 136. Advantageously, the VCTUs 302 allow for differential deployment of the inboard and outboard devices 144, 146 such that the outboard devices 146 may be driven independently of the inboard devices 144.

An example of a wing 116 of an aircraft 100 according to the present disclosure is depicted in FIG. 3. The wing 116 may include one or more spoilers 290 mounted on the wing, e.g., on an upper surface 122 of the wing 116. In some examples, the wing 116 may include ground spoilers 292 and/or flight spoilers 291. For clarity of illustration, only one wing 116 is depicted in FIG. 3, however it will be understood that any of the wings 116 of the aircraft 100 may include the same or similar features of the wing 116 depicted in FIG. 3. The ground spoilers 292 may be configured for actuation during ground operations. For example, the ground spoilers 292 may be operable to be actuated during landing after touchdown or during a rejected take-off to reduce aerodynamic lift of the wings 116 such that the weight of the aircraft 100 may be transferred to the landing gear for improved braking performance.

In the embodiment shown, the ground spoilers 292 include the innermost and outermost spoilers 290 on the wing 116. However, any one of the spoilers 290 may be configured as a ground spoiler 292. The flight spoilers 291 may configured for actuation during flight. In some examples, the flight spoilers 291 may be operable to deflect to relatively small flight deployment angles 548 (FIG. 5) and may be asymmetrically operated in conjunction with the ailerons 288 to facilitate roll control the aircraft 100. In further examples, the flight spoilers 291 on both wings 116 may be operable symmetrically, e.g., to function as speed brakes during flight to increase aerodynamic drag and reduce wing lift. The flight spoilers 291 may be configured to be actuated at augmented deployment angles 550 (FIG. 5) in conjunction with variable camber actuation of the leading edge devices 150 and/or trailing edge devices 240 as part of the emergency descent system 300 disclosed herein.

In FIG. 4, shown is a cross-section of a wing 116 of the aircraft 100 configured for high altitude cruise. The wing 116 includes a trailing edge device 240 configured as a simple flap 242 supported on a drop hinge 284 and shown in a neutral or retracted position 248. However, the trailing edge device 240 may be provided in any one of a variety of different trailing edge device 240 configurations and is not limited to a simple flap 240. For example, the trailing edge device 240 may be configured as a plain flap, a single-slotted flap, a multi-slotted Fowler flap, or any one of a variety of other trailing edge device configurations. The flap 242 may be actuated by a trailing edge device actuation system 280 such as a trailing edge linkage assembly 282 coupled to a torque tube 294, 296. As indicated above, the inboard and outboard flaps 244, 246 may be rotatably driven by a trailing edge PDU 404 (FIG. 11) that may be operated in conjunction with a VCTU 302. Deployment and retraction of the inboard and outboard flaps 244, 246 may be effected by rotating the torque tubes 294, 296 using the PDU 404 and/or the VCTU 302 as described in greater detail below.

In FIG. 4, the leading edge device 150 is configured as a slat 152 which is shown in a retracted position 158 on the leading edge 118 of the wing 116. As indicated above, the leading edge device 150 is not limited to a slat 152, and may be provided in any one of a variety of configurations including, but not limited to, a Krueger flap. The slat 152 may be actuated by a leading edge device actuation system 200 which may include a leading edge device PDU 402 (FIG. 11) and a VCTU 302 which may be located between the inboard and outboard slats 154, 156. Each one of the slats 152 may be supported by one or more carrier track assemblies 202. Each carrier track assembly 202 may include an arcuate guide track 204 supported by one or more guide rollers 212 mounted to the wing structure. Deployment and retraction of the slats 152 may be effected by rotating the torque tubes 294, 296 using the above-mentioned PDU 402 in conjunction with the VCTUs 302. Each guide track 204 may be coupled to the torque tube 294, 296 by means of a pinion gear 210 mounted on the torque tube 294, 296.

FIG. 5 shows a cross-section of the wing 116 configured for an emergency descent 576. Examples of positions or deflections of a leading edge device 150 (e.g., slat 152), and trailing edge device 240 (e.g., flap 240 and spoiler 290) are illustrated. As described herein, the emergency descent system 300 may be configured to automatically command the leading edge device 150 and/or the trailing edge device 240 to vary the wing 116 camber in a manner that increases aerodynamic drag of the wing 116. In some examples, and as will be further described, automatic actuation of the leading edge device 150 and/or the trailing edge device 240 to positions corresponding to the respective maximum drag settings 174, 264 may be initiated upon an occurrence of an event (e.g., cabin depressurization) and after the spoilers 290 have been commanded to the augmented deployment angle 550.

In FIG. 5, during the initiation of the emergency descent 576 (FIG. 2), the flight spoilers 291 (FIG. 3) may be deflected to the augmented deployment angle 550 and the ground spoilers 292 (FIG. 3) may remain in the retracted position 546. The augmented deployment angle 550 may be greater than the flight deployment angle 548. The flight deployment angle 548 may be the angle to which the flight spoilers 291 are actuated during normal cruise flight to assist the ailerons 288 (FIG. 3) in roll control of the aircraft 100. Advantageously, the deployment of the spoilers 290 in conjunction with the actuation of the leading edge devices 150 and/or the trailing edge devices 240 in the variable camber mode may increase the aerodynamic drag of the wings 116 relative to a reduced amount of aerodynamic drag generated by the spoilers 290 acting alone when such leading edge devices 150 and the trailing edge devices 240 are maintained in a retracted position 158, 248 (FIG. 4). The increase in aerodynamic drag as a result of the variable camber actuation of the leading edge devices 150 and/or trailing edge devices 240 advantageously minimizes the lift-to-drag (L/D) ratio of the aircraft 100 resulting in a faster emergency descent 576.

In FIG. 5, the leading edge device 150 and the trailing edge device 240 are automatically actuated to predetermined surface deflection angles 170, 260. For example, during the occurrence of a cabin depressurization and after the spoilers 290 are deployed into the augmented deployment angle 550, the leading edge device actuation system 200 and/or the trailing edge device actuation system 280 may position the respective leading edge and trailing edge devices 150, 240 in an upward direction 166, 256 and/or in a downward direction 168, 258 relative to a retracted position 158, 248. The leading edge device actuation system 200 and/or the trailing edge device actuation system 280 may be configured to limit movement of the respective leading edge devices 150 and trailing edge devices 240 to within deflection angles 170, 260 of less than approximately four degrees in an upward direction 166, 256 relative to a retracted position 158, 248, and/or less than approximately four degrees in a downward direction 168, 258 relative to the retracted position 158, 248. However, the device actuation systems 198 may be configured to actuate the leading edge devices 150 and the trailing edge devices 240 within deflection angles 170, 260 of approximately three degrees in each of the upward direction 166, 256 and the downward direction 168, 258 relative to the retracted position 158, 248.

In FIG. 5, the slat deflection angle 170 may be defined as the angle between a local wing chord line 140 and a local slat chord line 176. The slat chord line 176 may extend through a forward-most point on the slat 152 when the slat 152 is in a retracted position 158. In FIG. 5, the flaps 242 are configured as simple flaps 242, and the flap deflection angle 260 may be defined as the angle between the local wing chord line 140 and the local flap chord line 266. The local flap chord line 266 may be aligned with the local wing chord line 140 when the flap 242 is in a retracted position 158 (FIG. 4). However, for multi-slotted flaps 242 or other non-simple flap 242 configurations, the flap deflection angle 260 may be measured by different means.

In FIG. 5, during an emergency descent 576 (FIG. 2), the leading edge device actuation system 200 and/or the trailing edge device actuation system 280 may be automatically commanded to adjust the position of the respective leading edge devices 150 and trailing edge devices 240 in relatively small deflection increments 172, 262 in an upward direction 166, 256 to the retracted position 158, 248 (FIG. 4), and/or in relatively small deflection increments 172, 262 in a downward direction 168, 258 relative to the refracted position 158, 248. For example, the device actuation systems 198 may be configured to actuate the leading edge devices 150 and/or the trailing edge devices 240 in device deflection increments 172, 262 of less than approximately two degrees, and more preferably, in device deflection increments 172, 262 of less than approximately one degree, such as device deflection increments of approximately 0.3 degree.

In FIG. 6, shown is a cross-section of the wing 116 configured for low altitude 578 (FIG. 2) cruise flight (e.g., 10,000 feet) following an emergency descent 576. When the aircraft 100 is at the desired low altitude 578, the spoilers 290 may be moved to the retracted position 546 and the emergency descent deflections of the leading edge devices 150 and/or trailing edge devices 240 may be removed. In an embodiment, when the aircraft 100 is in low altitude 578 cruise, the leading edge devices 150 and/or trailing edge devices 240 may be actuated in a variable camber drag reduction mode. In the drag reduction mode, the leading edge device 150 and the trailing edge device 240 may be actuated upwardly and/or downwardly within the above-noted relatively small deflection angles 170, 260 (FIG. 5) for emergency descent 576.

The leading edge and/or trailing edge devices 150, 240 (FIG. 6) may be actuated in variable camber drag reduction mode to minimize aerodynamic drag of the wings 116 and maximize the L/D of the aircraft 100 for maximum fuel efficiency. The leading edge and/or trailing edge devices 150, 240 may be automatically actuated when the aircraft 100 is below a predetermined aircraft gross weight limit and is operating within a predetermined altitude-speed envelope. As described in greater detail below, the leading edge devices 150 and/or the trailing edge devices 240 may be actuated to weight-CG-altitude-speed scheduled deflection angles 170, 260 to vary the wing camber in a manner that maximizes the L/D of the aircraft 100.

Figure 7:
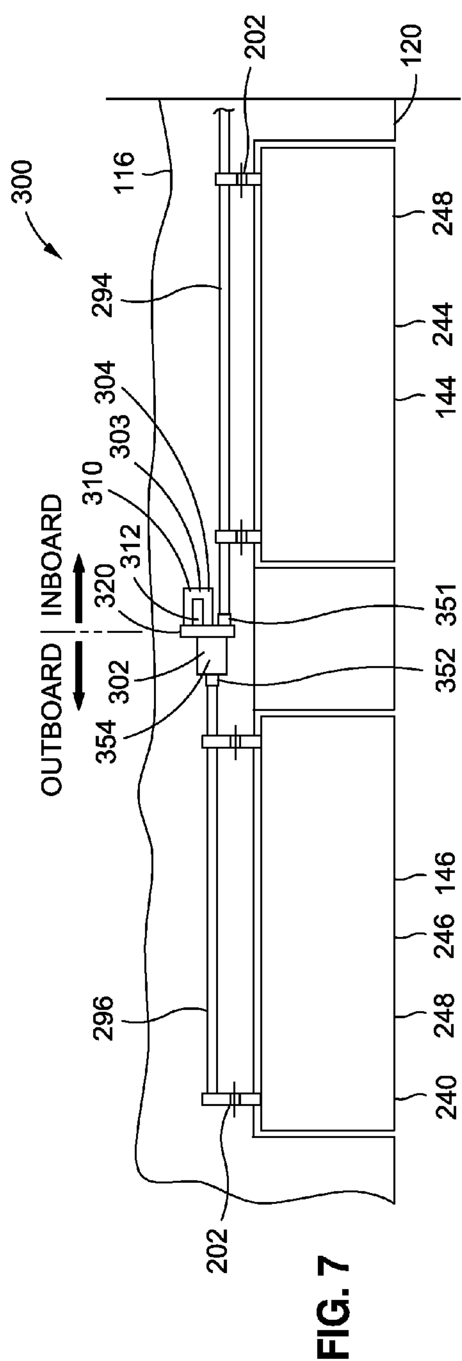
FIG. 7 is a diagrammatic plan view of a trailing edge of the wing taken along line 7 of FIG. 3 and schematically illustrating a variable camber trim unit (VCTU) positioned between an inboard device and an outboard device mounted to the wing trailing edge.
Figure 12:
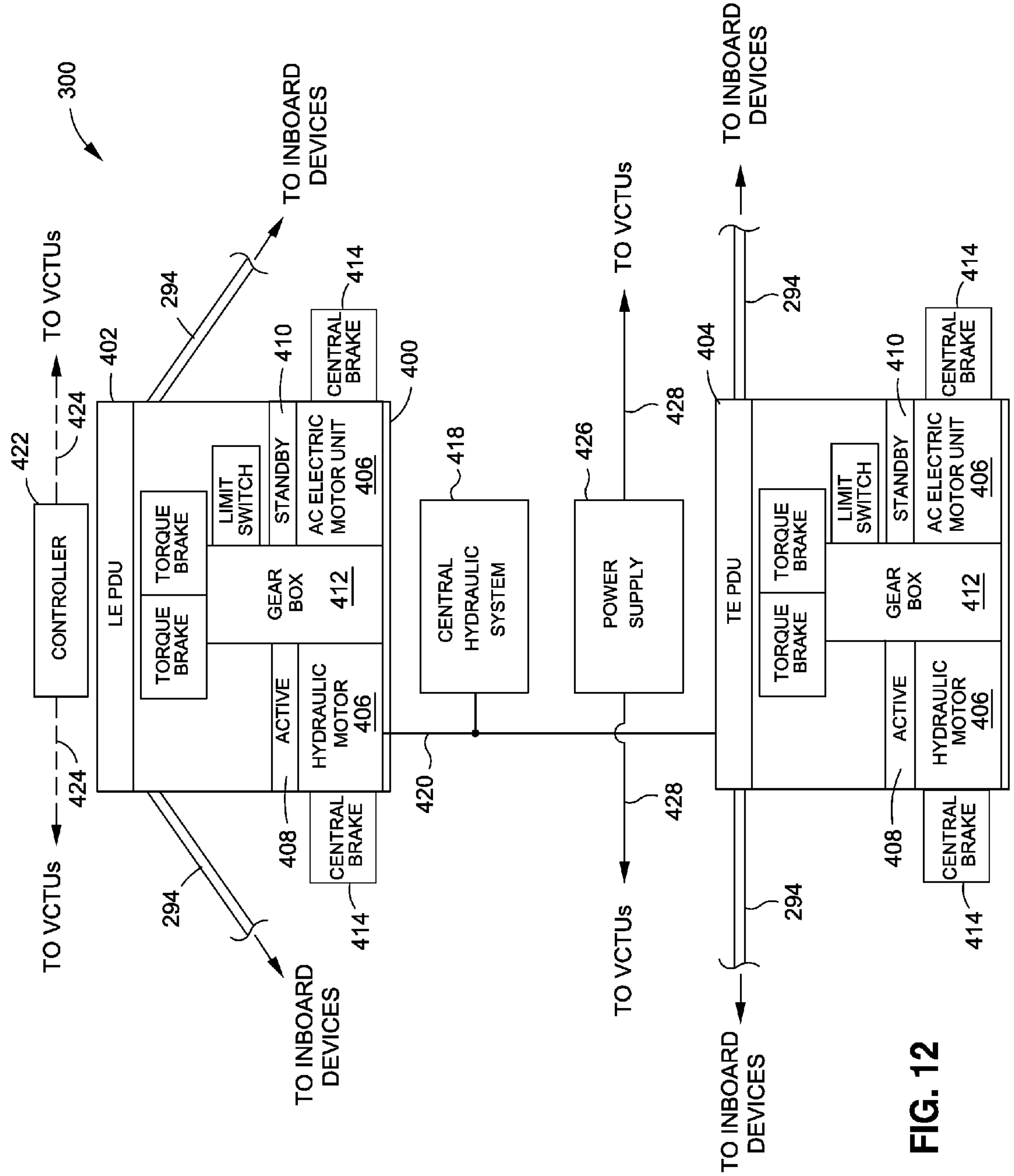
FIG. 12 is a diagrammatic view of a center portion of the leading edge and trailing edge actuation system and illustrating a leading edge power drive unit (PDU) and a trailing edge PDU for driving the inboard devices mounted on the respective leading edge and trailing edge of the wing.

In FIG. 7, shown is a diagrammatic plan view of a trailing edge 120 of a wing 116 illustrating a VCTU positioned between an inboard device 144 and an outboard device. As indicated above, the VCTU 302 may be operated in conjunction with the centrally-located PDU 404 (FIG. 11) to allow for actuation of the inboard device 144 and the outboard device 146 independent of one another. A similar arrangement may be provided for the inboard and outboard devices 144, 146 on the leading edge 118 (FIG. 4) of the wing 116. As indicated above, the inboard device 144 may be coupled to the inboard torque tube 294 and the outboard device 146 may be coupled to the outboard torque tube 296. As described in greater detail below, each VCTU 302 may include a dedicated VCTU electric motor 304 and a speed sum gearbox 320 having an outboard brake 354. The VCTU electric motor 304 may have a dedicated power-off brake 310. The inboard device 144 may be drivingly coupled to a central motor (e.g., as shown in FIGS. 11-12) of a PDU 400 (FIG. 11). The VCTU electric motor 304 and speed sum gearbox 320 may be assembled as an integrated unit that may be operated in conjunction with the PDU 400 to control the actuation of the outboard devices 146 relative to the inboard devices 144.

Figure 8:
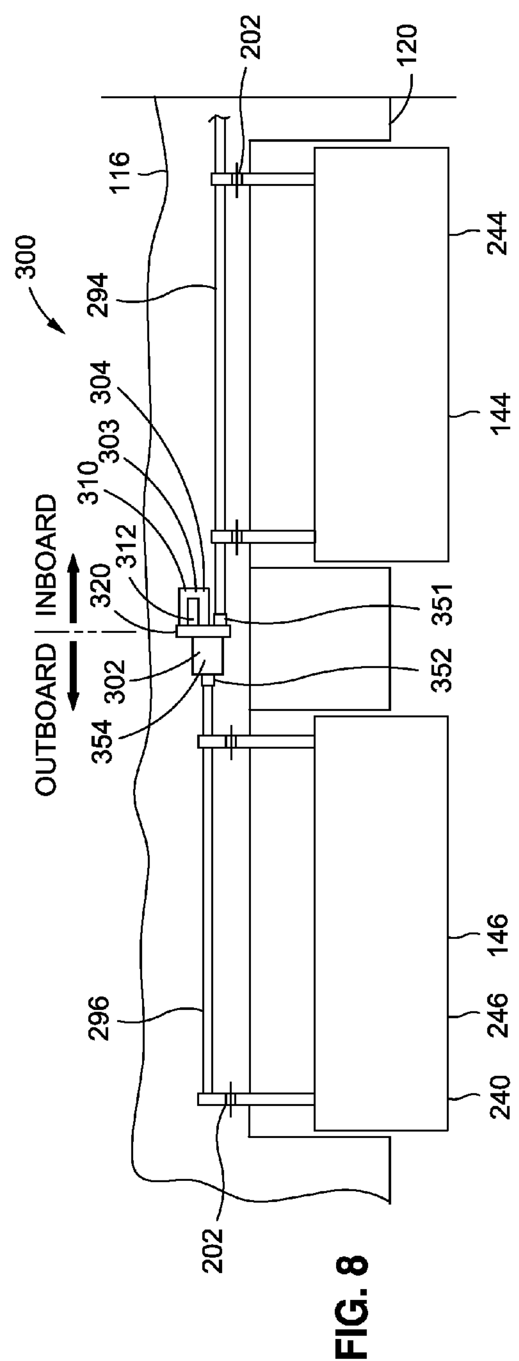
FIG. 8 is a diagrammatic plan view of the trailing edge of the wing illustrating the inboard device and outboard device actuated in unison.

In FIG. 8, shown is the wing trailing edge 120 portion of FIG. 7 and illustrating the operation of the VCTU 302 in conjunction with the PDU 400 (see FIG. 11) to activate the outboard device 146 and the inboard device 144 in unison. For actuation of the inboard and outboard devices 144, 146 in unison, a power-off brake 310 (FIG. 11) may initially be applied to prevent rotational movement of the VCTU electric motor 304. The central motor 406 of the PDU 400 (e.g., as shown in FIGS. 11-12) may be activated for drivingly actuating the inboard device 144. With the power-off brake 310 applied, actuation of the inboard device 144 by the central motor 406 rotates the inboard torque tube 294. When the power-off brake 310 is applied, the rotational movement of the inboard torque tube 294 is transferred through the speed sum gearbox 320 (FIG. 7) to the outboard torque tube 296 resulting in actuation of the inboard device 144 and the outboard device 146 in unison.

Figure 9:
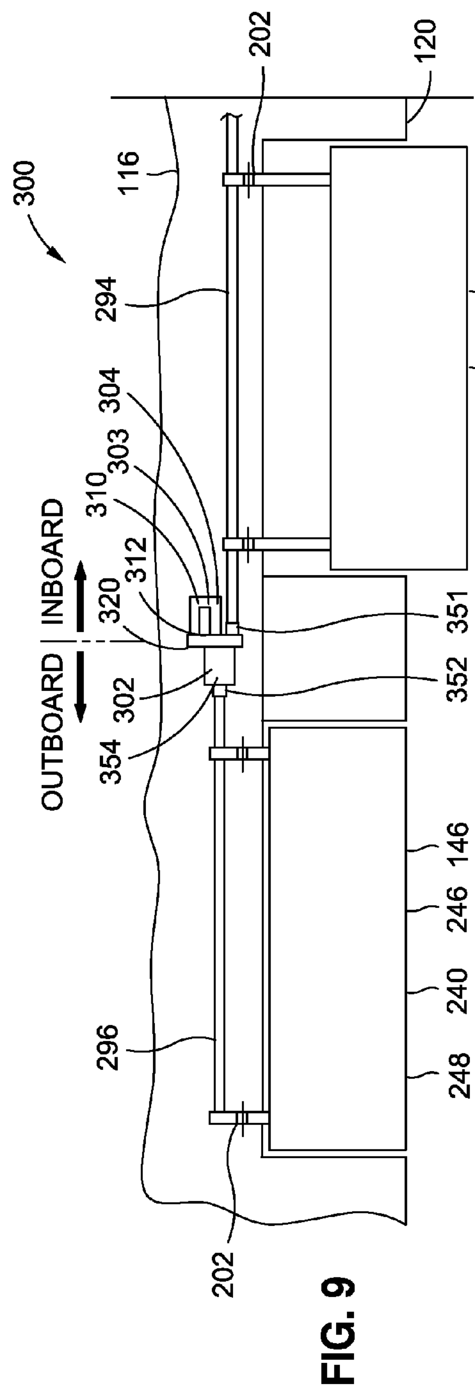
FIG. 9 is a diagrammatic plan view of the trailing edge of the wing illustrating the inboard device actuated independently of the outboard device.

In FIG. 9, shown is the wing trailing edge 120 portion with the inboard device 144 being actuated independently of the outboard device 146. As described below, for independent actuation of the inboard device 144, the power-off brake 310 of the VCTU electric motor 304 is released. The outboard brake 354 of the VCTU 302 is applied to prevent movement of the outboard device 146. The central motor 406 (FIG. 12) of the PDU 400 (FIG. 11) is activated as described above resulting in rotation of the inboard torque tube 294. The speed sum gearbox 320 is configured such that rotation of the inboard torque tube 294 causes the VCTU electric motor 304 to be back-driven while the inboard device 144 is actuated by the central motor 406, as described in greater detail below.

Figure 10:
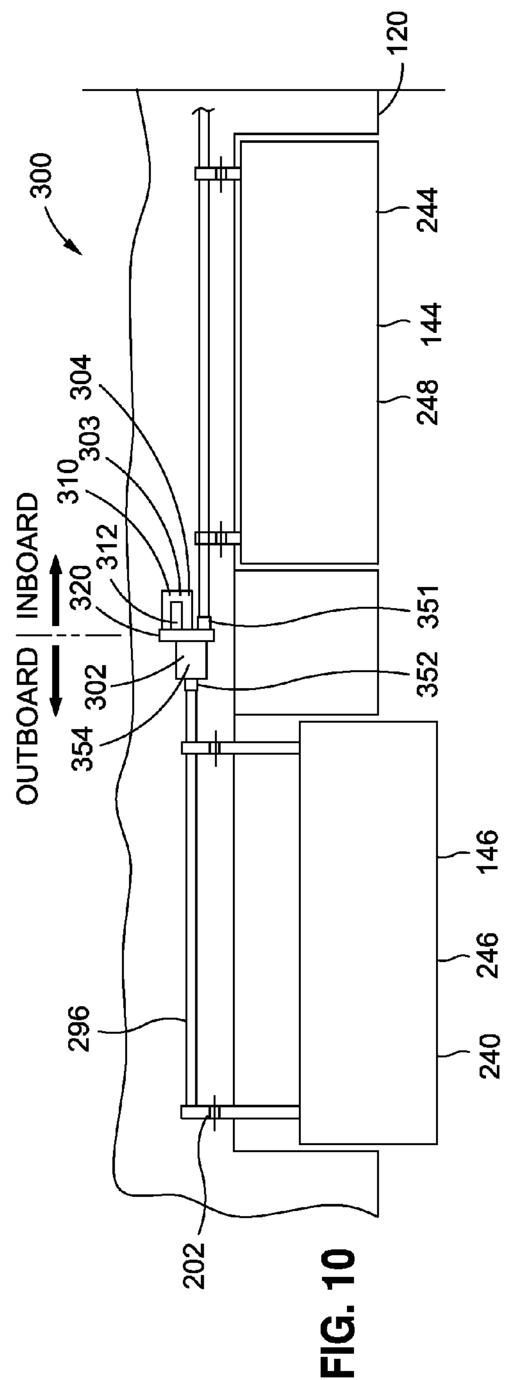
FIG. 10 is a diagrammatic plan view of the trailing edge of the wing illustrating the outboard device actuated independently of the inboard device.

In FIG. 10, shown is the trailing edge 120 portion of the wing 116 with the outboard device 146 being actuated independently of the inboard device 144. As described below, for independent actuation of the outboard device 146, the central motor 406 of the PDU 400 is prevented from rotating the inboard device 144 by applying a central brake 414 (FIG. 12 which may be coupled to the central motor 406 (FIG. 12) and included in the PDU 400. The outboard brake 354 of the VCTU 302 is released. Additionally, the power-off brake 310 of the VCTU electric motor 304 is released. The VCTU electric motor 304 is then activated causing rotation of the outboard torque tube 296 and resulting in actuation of the outboard device 146 independent of the inboard device 144. In an embodiment, the amount of movement of the outboard device 146 may be limited to avoid exceeding a predetermined maximum inboard-outboard device split limit which may represent a maximum allowable difference in deflection angles or positions of the inboard device 144 and the outboard device 146 relative to one another.

Advantageously, the operation of the VCTU 302 in conjunction with the PDU 400 (FIG. 11) provides a means for actuating the leading edge 118 (FIG. 4) and/or trailing edge 120 outboard device 146 and/or inboard device 144 independently of one another to provide variable camber for the wing 116 along a chordwise direction 138 or spanwise direction 136. In this regard, the operation of the VCTU 302 in conjunction with the PDU 400 simplifies independent actuation of inboard and outboard devices 144, 146 relative to conventional clutch-based systems which may require a relatively large number of discrete movements for positioning inboard and outboard devices at target variable camber positions. Operation of the VCTUs 302 in conjunction with the PDUs 400 significantly reduces the amount of time required for differential deployment of the inboard and outboard devices 144, 146 as may be required for configuring an aircraft 100 for an emergency descent 576.

In FIG. 11, shown is a diagrammatic view of a device actuation system incorporating VCTUs 302 between the inboard devices 144 and outboard devices 146 on the leading edge 118 and trailing edge 120 of each wing 116 of the aircraft 100. In the embodiment shown, the device actuation system may include a leading edge PDU 402 coupled to the leading edge devices 150 on opposite sides of the fuselage 102, and a trailing edge PDU 404 coupled to the trailing edge devices 240 on opposite sides of the fuselage 102. The device actuation system may be controlled by flight control electronics 422 which may be centrally-located on the aircraft 100 and/or may be positioned adjacent to one or both of the PDUs 400. The flight control electronics 422 may be configured to generate command signals representative of target variable camber positions of the leading edge devices 150 and the trailing edge devices 240. The command signals may be transmitted via one or more command lines 424 or wirelessly transmitted to the leading edge PDU, the trailing edge PDU, and to the motor controller 303 of each VCTU 302.

In FIG. 11, each motor controller 303 may control the VCTU electric motor 304, the outboard brake 354, and/or the power-off brake 310 of the VCTU 302. The flight control electronics 422 may transmit command signals to the motor controller 303 of the VCTU electric motor 304 and to the central motor 406 (FIG. 12) causing actuation (e.g., deployment and retraction) of at least one of the inboard and outboard devices 144, 146 according to a minimum actuation step as described below. The flight control electronics 422 may receive position signals from one or more position sensor 312*s* (see e.g., FIGS. 7-10) that may be included with each one of the VCTUs 302. The position signals may represent the current position or deflection angle of each one of the inboard devices 144.

In FIG. 11, the device actuation system may further include a central power supply 426 (FIG. 12) for powering the VCTU electric motor 304 of each one of the VCTUs 302. The power supply 426 may be centrally-located such as adjacent to the PDUs 400. In an embodiment, each VCTU electric motor 304 may include the above-mentioned motor controller 303 which may be powered by the central power supply 426 with a substantially continuous supply of relatively low-voltage power. Such low-voltage power may be removed from the motor controller 303 for certain types of faults. Relatively high-voltage power may be provided to the VCTU electric motors 304 from the central power supply 426 (FIG. 12) via an electric supply line 428 to cause the VCTU electric motor 304 to rotate such as in response to a command signal transmitted along a command line 424 from the flight control electronics 422 to the motor controller 303.

As shown in FIG. 11, each one of the VCTUs 302 may include a VCTU electric motor 304 and a speed sum gearbox 320. An outboard brake 354 may be included with each VCTU 302 to prevent rotation of the outboard device 146 as indicated above. The VCTU 302 may include the above-mentioned power-off brake 310 which may be coupled to the VCTU electric motor 304 and which may be applied by one or more coils 318. The coils 318 may receive power from the centrally-located central power supply 426 (FIG. 12) via an electric supply line 428 for activating the power-off brake 310 such as in response to a command signal received from the flight control electronics 422 via a command line 424. One or more resolvers 316 may be included at different locations on the leading edge devices 150 and/or trailing edge devices 240 for indicating the positions of such devices 150, 240 and which may be provided to the flight control electronics 422.

FIG. 12 is a diagrammatic view of a center portion of the variable camber actuation system showing the leading edge PDU 402 and the trailing edge PDU 404. As indicated earlier, the leading edge PDU 402 and the trailing edge PDU 404 may be coupled to the inboard torque tubes 294 on the leading edge 118 and the trailing edge 120 of the wing 116. In an embodiment, each one of the PDUs 400 may include at least one central motor 406. For example, in FIG. 12, each one of the PDUs 400 may include an active motor 408 and a backup motor 410. Each one of the central motors 406 may be coupled to or may include a central brake 414 configured as a power-off brake for preventing rotation of the central motor 406 and thereby preventing actuation of the inboard device 144 to which the central motor 406 is coupled.

In FIG. 12, in an embodiment, the active motor 408 and/or the backup motor 410 may be configured as a hydraulic motor or an electrohydraulic actuator which may be coupled to a central hydraulic system 418 via one or more hydraulic lines 420. In an embodiment, the active motor 408 and/or the backup motor 410 may optionally be configured as an electromechanical actuator or an electric motor for controlling the actuation of the inboard device. The central motors 406 may be coupled to the inboard torque tubes 294 for driving the inboard devices 144. Each one of the PDUs 400 may include a central gearbox 412 and one or more central brakes 414. Each one of the central motors 406 may be coupled to a central brake 414 (e.g., a power-off brake) which may be configured to prevent movement of the inboard device 144 when both central brakes 414 are applied.

Figure 13:
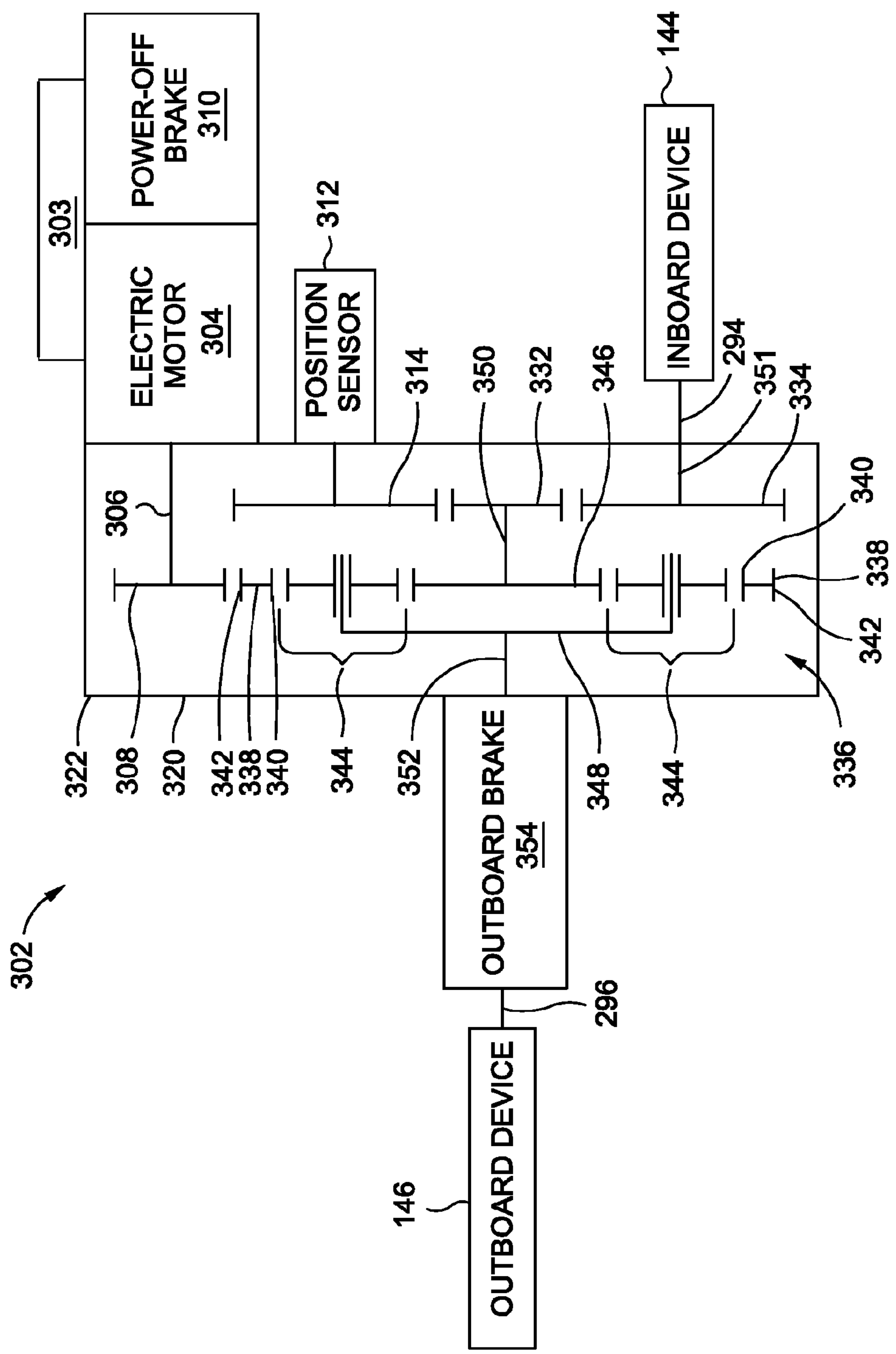
FIG. 13 is a schematic diagram of a VCTU including a speed sum gearbox having an outboard brake and a VCTU electric motor.

FIG. 13 is a schematic diagram of an embodiment of a VCTU 302 illustrating the interconnection of the speed sum gearbox 320 with the outboard brake 354, the VCTU electric motor 304 and power-off brake 310, and the position sensor 312. The speed sum gearbox 320 includes an inboard shaft 351 that may be coupled to the inboard device 144 via an inboard torque tube 294, and an outboard shaft 352 that may be coupled to the outboard device 146 via an outboard torque tube 296. The VCTU electric motor 304 may include a motor shaft 306 having a motor pinion 308 that may be engaged to a ring gear 338 of the speed sum gearbox 320.

The speed sum gearbox 320 may be configured such that if one of the three shafts (i.e., the inboard shaft 351, the outboard shaft 352, the motor shaft 306) is held stationary and prevented from rotating, the remaining pair of shafts will rotate under the driving force of one of the remaining shafts of the pair. For example, if the inboard shaft 351 is prevented from rotating due to application of the central brake 414 of the PDU, then rotation of the motor shaft 306 will cause rotation of the outboard shaft 352 resulting in actuation of the outboard device 146 independent of the inboard device 144. If the motor shaft 306 is prevented from being rotated due to application of the power-off brake 310, then rotation of the inboard shaft 351 will cause rotation of the outboard shaft 352 resulting in actuation of the inboard and outboard device 146 in unison with one another. If the outboard shaft 352 is prevented from rotating due to application of the outboard brake 354, then rotation of the inboard shaft 351 by the central motor 406 (FIG. 12) will cause the VCTU electric motor 304 to be back-driven while the inboard device 144 is actuated and the outboard device 146 is stationary In FIG. 13, the inboard shaft 351 may be fixedly (e.g., non-rotatably) coupled to the inboard device 144 via the inboard torque tube 294. The outboard shaft 352 may be fixedly (e.g., non-rotatably) coupled to the outboard device 146 via the outboard torque tube 296. The inboard shaft 351 may include an inboard pinion 334 that may be coupled to an inboard gear 332 of the speed sum gearbox 320. The inboard gear 332 may be mounted on or fixedly (i.e., non-rotatably) coupled to a sun gear shaft 350 of a sun gear 346 of the speed sum gearbox 320. The position sensor 312 may include a position sensor gear 314 that may be engaged to the inboard gear 332 for sensing a position of the inboard device 144 and transmitting a position signal to the flight control electronics 422. The speed sum gearbox 320 may include a plurality of planet gears 344 that may be supported on a carrier 348. The carrier 348 may be fixedly (i.e., non-rotatably) coupled to or mounted on the outboard shaft 352. The planet gears 344 may encircle and may be engaged to the sun gear 346. The plurality of planet gears 344 may be circumscribed by a ring gear 338. The motor pinion 308 may be engaged to an external side 342 of the ring gear 338.

Figure 14:
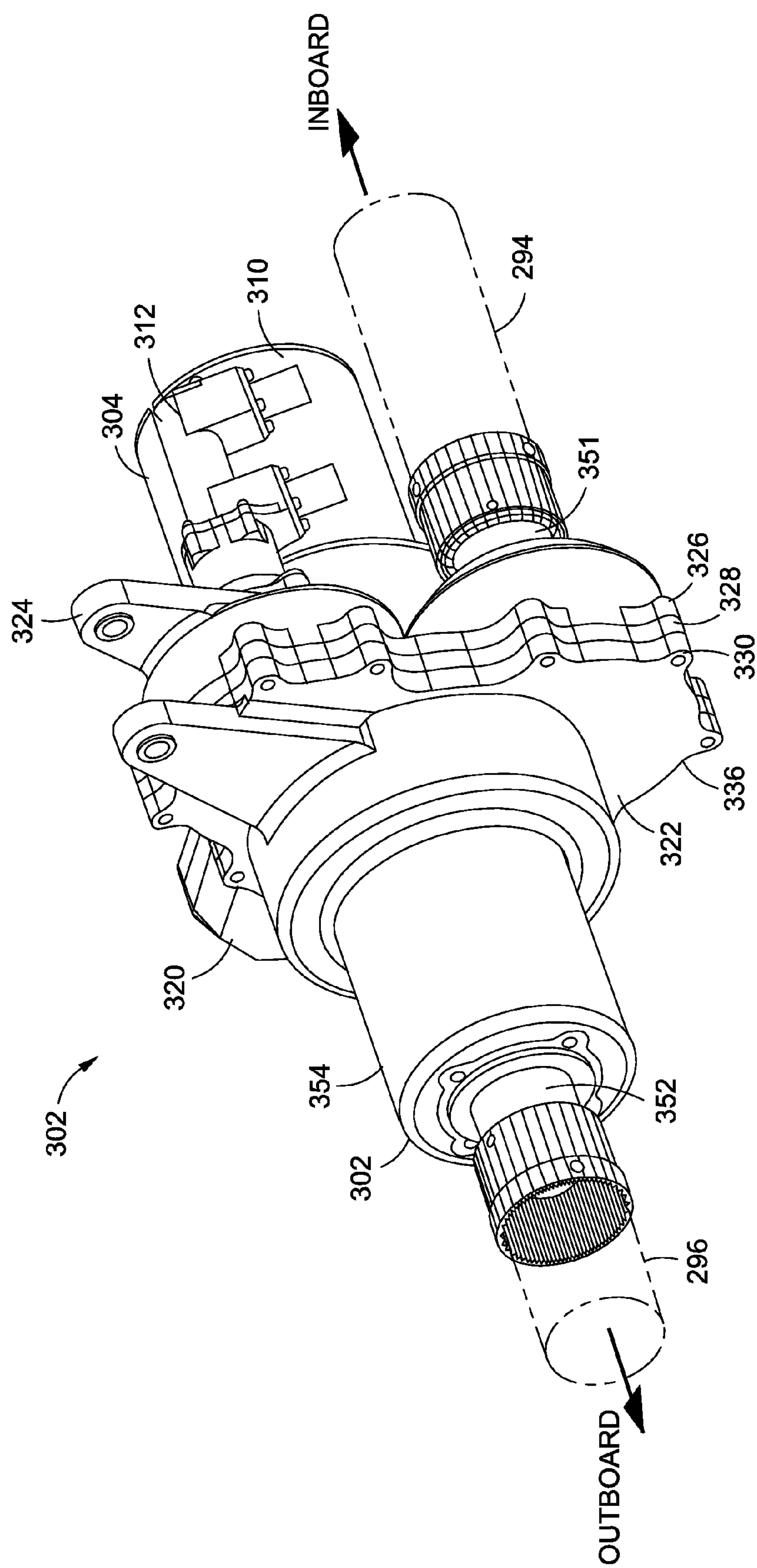
FIG. 14 is a perspective illustration of an embodiment of a VCTU.

FIG. 14 is a perspective illustration of an embodiment of the VCTU 302 and showing the inboard torque tube 294 coupled to the inboard shaft 351 and the outboard torque tube 296 coupled to the outboard shaft 352 of the speed sum gearbox 320. The VCTU 302 may comprise an integrated unit including the VCTU electric motor 304 and associated power-off brake 310, outboard brake 354, and position sensor 312, all of which may be supported by or enclosed, at least partially, within the VCTU housing 322. The VCTU housing 322 may include one or more mounting tabs 324 for mounting the VCTU 302 to the wing structure of an aircraft 100.

Figure 15:
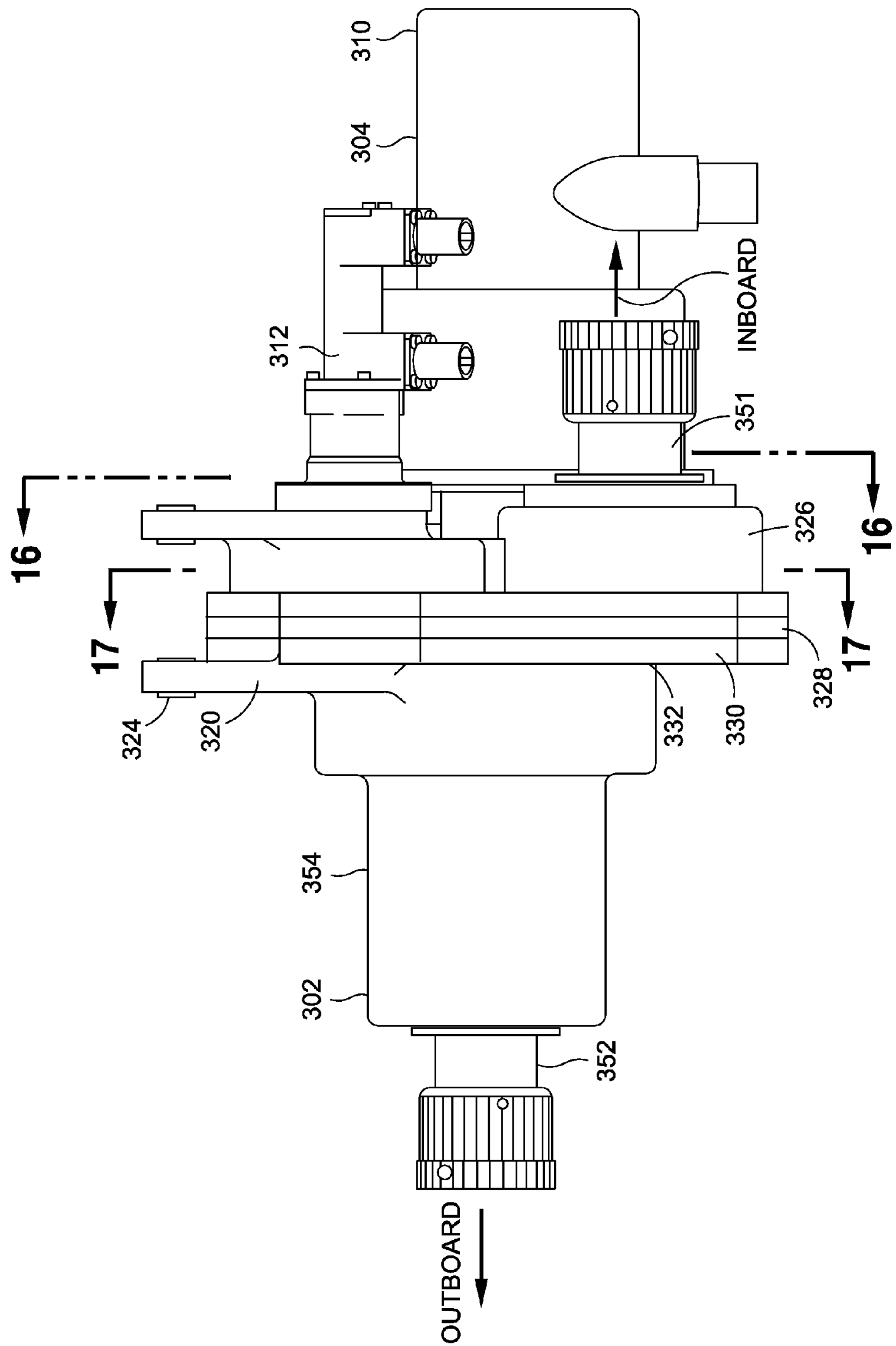
FIG. 15 is a forward-looking view of an aft side of the VCTU.

FIG. 15 is a forward-looking view of the VCTU 302 illustrating the VCTU housing 322. In an embodiment, the VCTU housing 322 may be made up of an inner housing 326 on the inboard side of the VCTU 302, an outer housing 330 on an outboard side of the VCTU 302, and a mid housing 328 sandwiched between the inner housing 326 and the outer housing 330. Although not shown, the inner housing 326, the mid housing 328, and the outer housing 330 may be mechanically coupled together such as with mechanical fasteners. The three-piece arrangement of the housing may facilitate assembly and disassembly of the VCTU 302 such as for maintenance and inspection. Although not shown, the VCTU housing 322 may be sealed from the elements by a seal extending around a perimeter at the interface of the housings. The VCTU housing 322 may be configured to provide a relatively rigid load path for operational loads.

Figure 16:
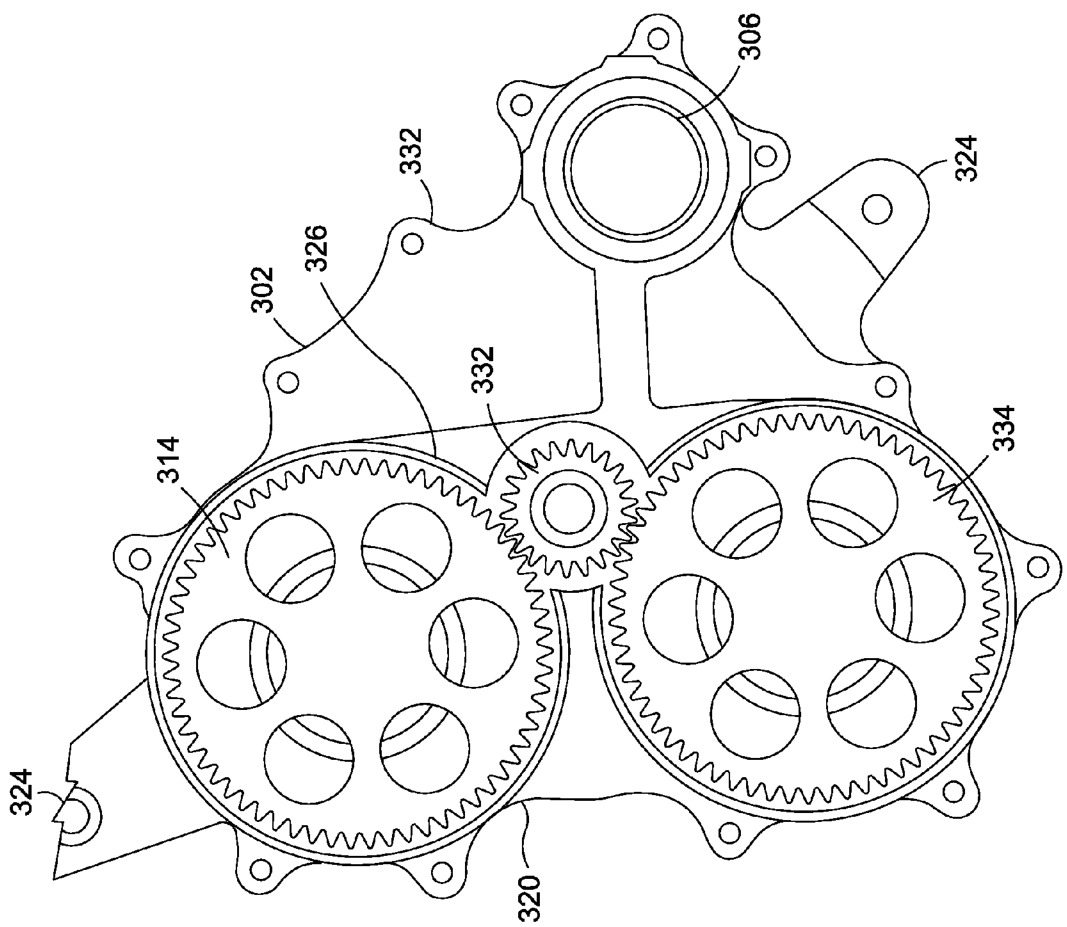
FIG. 16 is a sectional view of the VCTU taken along line 16 of FIG. 15 and illustrating the interconnectivity of an inboard pinion, an inboard gear, and a position sensor gear.

FIG. 16 is a sectional view of the VCTU 302 showing the inboard pinion 334 and the position sensor gear 314 operatively engaged to one another by the inboard gear 332. In an embodiment, the inboard gear 332 may be omitted, and the inboard shaft 351 may be directly coupled to the sun gear 346. In such an arrangement, the position sensor gear 314 may be engaged to another gear (not shown) that may be mounted on or integrally formed with the inboard shaft 351 to allow the position sensor 312 to sense the position of the inboard device 144 for transmitting a representative position signal to the flight control electronics 422.

Figure 17:
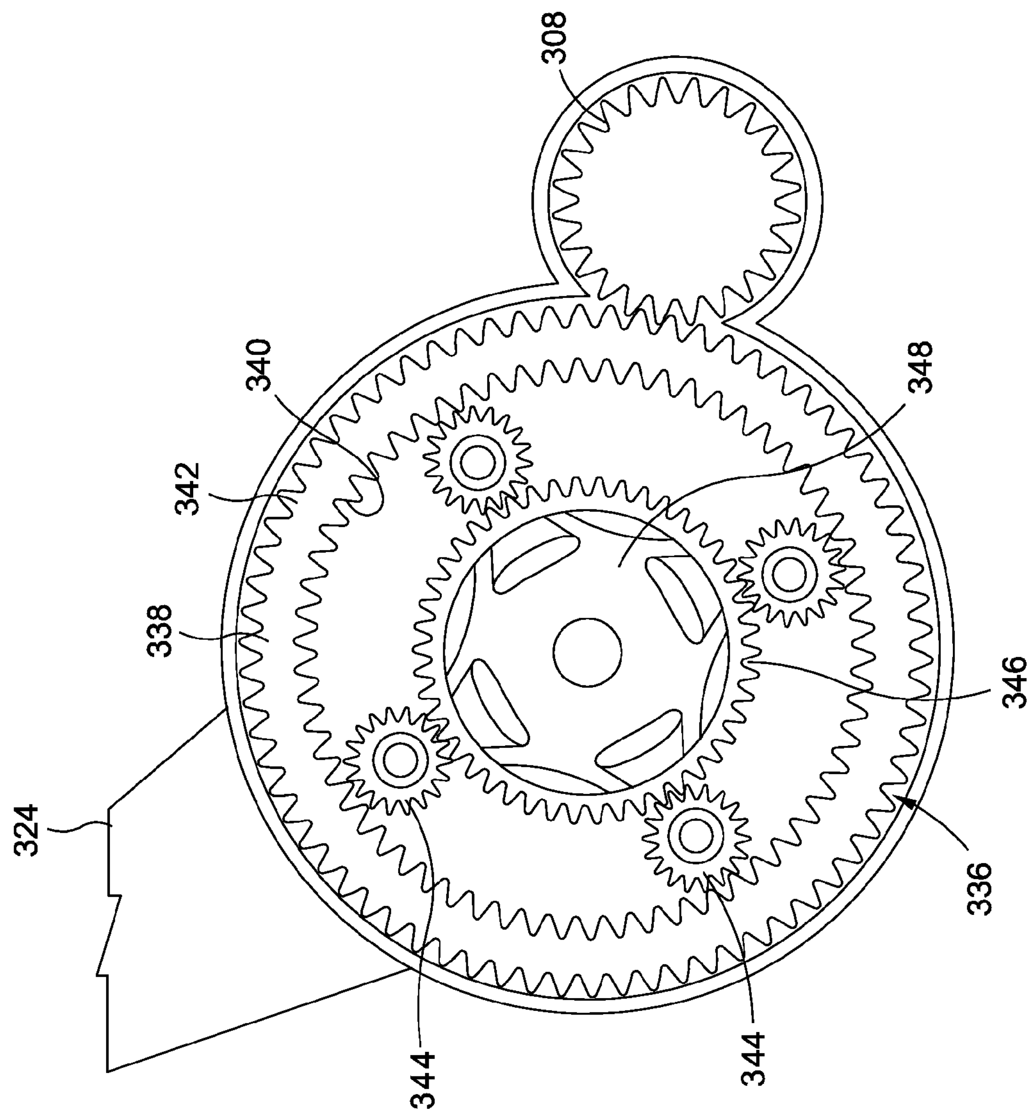
FIG. 17 is a sectional view of the VCTU taken along line 17 of FIG. 15 and illustrating the interconnectivity of a planetary gear system and the outboard brake.

FIG. 17 is a sectional view of the VCTU 302 showing the speed sum gearbox 320 configured as a planetary gear system 336. As indicated above, the speed sum gearbox 320 includes a central sun gear 346 having gear teeth and which is surrounded by a plurality of planet gears 344. The planet gears 344 are supported on the carrier 348 which may be fixedly mounted to the outboard shaft 352. The gear teeth of the planet gears 344 are engaged to the gear teeth on the internal side 340 of the ring gear 338 which circumscribes the planet gears 344. The motor pinion 308 of the VCTU electric motor 304 are engaged to the external side 342 of the ring gear 338.

FIG. 18 is a diagrammatic view of an embodiment of an emergency descent system 300 according to some examples of the present disclosure. The emergency descent system 300 may include a flight control computer 450, a speedbrake control system 530, and an edge control system 452. The speedbrake control system 530 and the edge control system 452 may be integrated into a flight control system (not shown) of the aircraft 100 and certain components of the speedbrake control system 530 and the edge control system 452 may be mounted on a console or control stand on the flight deck 105 (FIG. 1). The edge control system 452 may include an edge control device 453 which may include a plurality of control device positions 458 corresponding to leading edge device 150 settings and trailing edge device 240 settings. In an embodiment, the edge control device 453 may include a flap control lever 454 that may be movable along a forward and aft direction. The flap control lever 454 may be positionable at one or more flap lever positions. However, the edge control device 453 may be provided in alternative embodiments and is not limited to a flap control lever 454. The edge control device 453 may include one or more mechanical gates 456 configured to prevent movement of the flap control lever 454 unless the flap control lever 454 is lifted, depressed, or otherwise manipulated as a means to prevent inadvertent retraction of the leading edge devices 150 and/or trailing edge devices 240.

In FIG. 18, the control device positions 458 may include a cruise position 462 designated by UP, a hold position 464 designated as HOLD, a climb position or approach position 466 designated as CLB/APP, a take-off position 468 or go-around position 470 designated as TOGA, and a landing position 472 designated as LAND. The control device positions 458 may be designated by different nomenclature and are not limited to the illustrated designations in FIG. 18. For example, the control device positions 458 may include UP, F1, F5, F20, and F30, or the control device positions 458 may include 0, 1, 2, 3/OPT, FULL, and which may generally correspond to the above-noted UP, HOLD, CLB/APP, TOGA, and LAND control device positions 458.

The speedbrake control system 530 may include a speedbrake control device 532 such as speedbrake lever 534, for example as shown in FIG. 18. The speedbrake control device 532 may have a plurality of speedbrake detents 536 each representing a deployment angle for the spoilers 290. In the embodiment shown, the speedbrake control device 532 includes speedbrake detents 536 such as a down detent 538 designated as DOWN, an armed detent 540 designated as ARMED, a flight detent 542 designated as FLIGHT DETENT, and an up detent 544 designated as UP. However, the speedbrake control device 532 may include any other number or combination of speedbrake detents, for example a larger or smaller quantity of speedbrake detents 536. In other examples, the speedbrake detents 536 may be designated by nomenclature different from the particular example depicted in FIG. 18 and designations for the speedbrake detents are not limited to the illustrated designations in FIG. 18.

In FIG. 18, the flight control computer 450 may be configured to compute a maximum drag setting 174, 264 for the leading edge devices 150 and/or the trailing edge devices 240 based on aircraft state data 500. For example, as indicated above, the flight control computer 450 may be configured to compute a maximum drag setting 174, 264 based on an indication of cabin pressure altitude 514 and an indication that the speedbrake lever 534 is in the flight detent 542 and/or the spoilers 290 are actuated to the augmented deployment angle 550 (FIG. 5). The aircraft state data 500 may also include aircraft altitude 510, aircraft gross weight 502, aircraft 100 center of gravity 504, Mach number 506, speedbrake lever position 534, cabin pressure altitude 514, and other parameters representative of the state of the aircraft 100. In an embodiment, the emergency descent system 300 may be configured such that the flight control computer 450 continuously updates the maximum drag setting 174 based on continuously updated aircraft state data 500 when the flap control lever 454 is in the cruise position 462 and the speedbrake control device 532 is in the flight detent 542. In an embodiment, the device actuation system 198 may be configured to adjust the variable camber position of one or more of the leading edge devices 150 and/or the trailing edge devices 240 based on the updated aircraft state data 500.

In FIG. 18, the edge control system 452 and the speedbrake control system 530 may be communicatively coupled to the flight control computer 450. As indicated above, when an indication is received at the flight control computer 450 that the cabin pressure altitude 514 exceeds a predetermined limit (e.g., 8,000 feet) and the speedbrake lever 534 is moved to the flight detent 542, the edge control system 452 may automatically command the leading edge device actuation system 200 and/or the trailing edge device actuation system 280 to position at least one of the leading edge devices 150 and/or the trailing edge devices 240 at the respective maximum drag setting 174, 264. As indicated above, the emergency descent system 300 may include VCTUs 302 operating in conjunction with the PDUs 400 to allow for actuation of the inboard devices 144 and the outboard devices 146 independent of one another on the leading edge 118 and/or on the trailing edge 120 of the wings 116. In this regard, the leading edge devices 150 and/or the trailing edge devices 240 on the leading edge 118 and/or trailing edge 120 may then be automatically differentially deployed to the respective maximum drag settings 174, 264 which may vary the wing camber along a spanwise direction 136 and/or along a chordwise direction 138. The variation of the wing camber may maximize the aerodynamic drag of the wings 116 which may minimize the L/D of the aircraft 100 resulting in an increase in the descent rate of the aircraft 100 relative to the amount of drag that may be generated by spoilers acting alone without the benefit provided by leading edge and trailing edge devices.

For example, in an embodiment, the inboard flaps 244 may be deflected to +3.5 degrees and the outboard flaps 246 may be deflected to −0.5 degree. In addition, other trailing edge devices 240 may be actuated in conjunction with the actuation of the flaps 242. For example, along with the above-noted differential deployment of the inboard and outboard flaps 244, 246, the flaperons 286 may be deflected to +1.5 degrees, and the ailerons 288 may be deflected to −2.5 degrees. In the above example, the inboard and outboard slats 154, 156 may be maintained in a retracted position 158. However, the inboard and outboard leading edge devices 150 may be differentially deployed depending upon the aircraft state data 500 to maximize aerodynamic drag of the wings 116 during the emergency descent. The above-noted deflection angles 170, 260 of the leading and trailing edge devices 240 are one example of the variable camber actuation of the leading and trailing edge devices 240, and are not to be construed as limiting of alternative deflection angles 170, 260 which may vary based on aircraft 100 configuration and aircraft state data 500.

FIG. 19 shows a collection of graphs illustrating certain parameters and/or aircraft state data 500 as a function of time 572 during operation of an emergency descent system 300 according to the present disclosure. For example, differential deployment of the inboard and outboard slats 154, 156 and the inboard and outboard flaps 244, 246 and other trailing edge devices 240 to the respective maximum drag settings 174, 264 during an emergency descent mode 580 are shown in the bottom six plots in FIG. 19. In the uppermost plot in FIG. 19, an altitude 510 of the aircraft 100 is shown as a function of time 572, illustrating the aircraft 100 initially at high altitude during the cruise segment 574 followed by an emergency descent mode 580 of the aircraft 100. An emergency descent mode 580 may be engaged when the speedbrake lever 534 is moved to the flight detent 542. A drag reduction mode 582 may be disabled or disengaged upon engagement of the emergency descent mode 580, as shown in the plot illustrating the parameter VC-DR ENBL as a function of time.

It will be understood that the naming or designation of any of the parameters in FIG. 19 is illustrative only and any other naming of designation can be used. FIG. 19 further illustrates the actual deflection angles 170 of the inboard slats 154 and the outboard slats 156 as a function of time 572 and illustrates the differential deployment of the inboard and outboard slats 154, 156 during the cruise segment 574. Also shown in FIG. 19 are plots illustrating the actual deflection angles 260 of the trailing edge devices 240 as a function of time 572. In the emergency descent mode 580, the inboard and outboard flaps 244, 246 and/or the inboard and outboard slats 154, 156 may be differentially deployed to different maximum drag settings 264, 174 as computed by the flight control computer 450. In some examples, the flaperons 286 and/or the ailerons 288 may be deployed differentially to respective actual maximum drag settings 264, which may be different than the deflection angles 260 of the inboard and outboard flaps 244, 246.

As described herein, the emergency descent system 300 may be configured to command the leading and/or trailing edge devices in the first mode until the aircraft 100 reaches the second altitude (e.g., the relatively low altitude of low altitude cruise segment 578). Following descent of the aircraft 100 to the low altitude, the emergency descent system 300 may be configured to disengage the emergency descent mode and engage a drag reduction mode, as shown by the parameter VC-DR ENBL. As previously described, the flight control computer 450 may compute a setting for the leading edge devices 150 and/or the trailing edge devices 240 selected to reduce or minimize aerodynamic drag and may allow the aircraft 100 to conserve fuel while diverting to an airport. Upon receiving an indication of low cruise altitude at the flight control computer 450, the emergency descent system 300 (e.g., the flight control computer 450) may be configured to automatically command the leading and/or trailing edge devices to position(s) associated with the setting, in some cases the leading and/or trailing edge devices may be independently actuated to different positions as described above.

In some examples, the flight control computer 450 may compute an optimum flap setting based on aircraft state data 500 such as aircraft gross weight 502, aircraft center of gravity 504, and other aircraft parameters. In the drag reduction mode 582, the flight control computer 450 may continuously or periodically (e.g., every minutes, few minutes, or upon a detection in a change in aircraft state data) re-compute an optimum setting and command the slats 152 and flaps 242 to the recomputed optimum setting. In some examples, while the emergency descent system 300 is in the drag reduction mode 582, the device actuation systems 200, 280 may periodically (e.g., every five minutes, ten minutes, etc.) reposition the slats 152 and flaps 242 according to weight-CG scheduled surface deflection angles in an upward direction 166, 256 and/or downward direction 168, 258 within the above-described deflection 170, 260 angles, e.g., as shown in FIG. 5.

Figure 20:
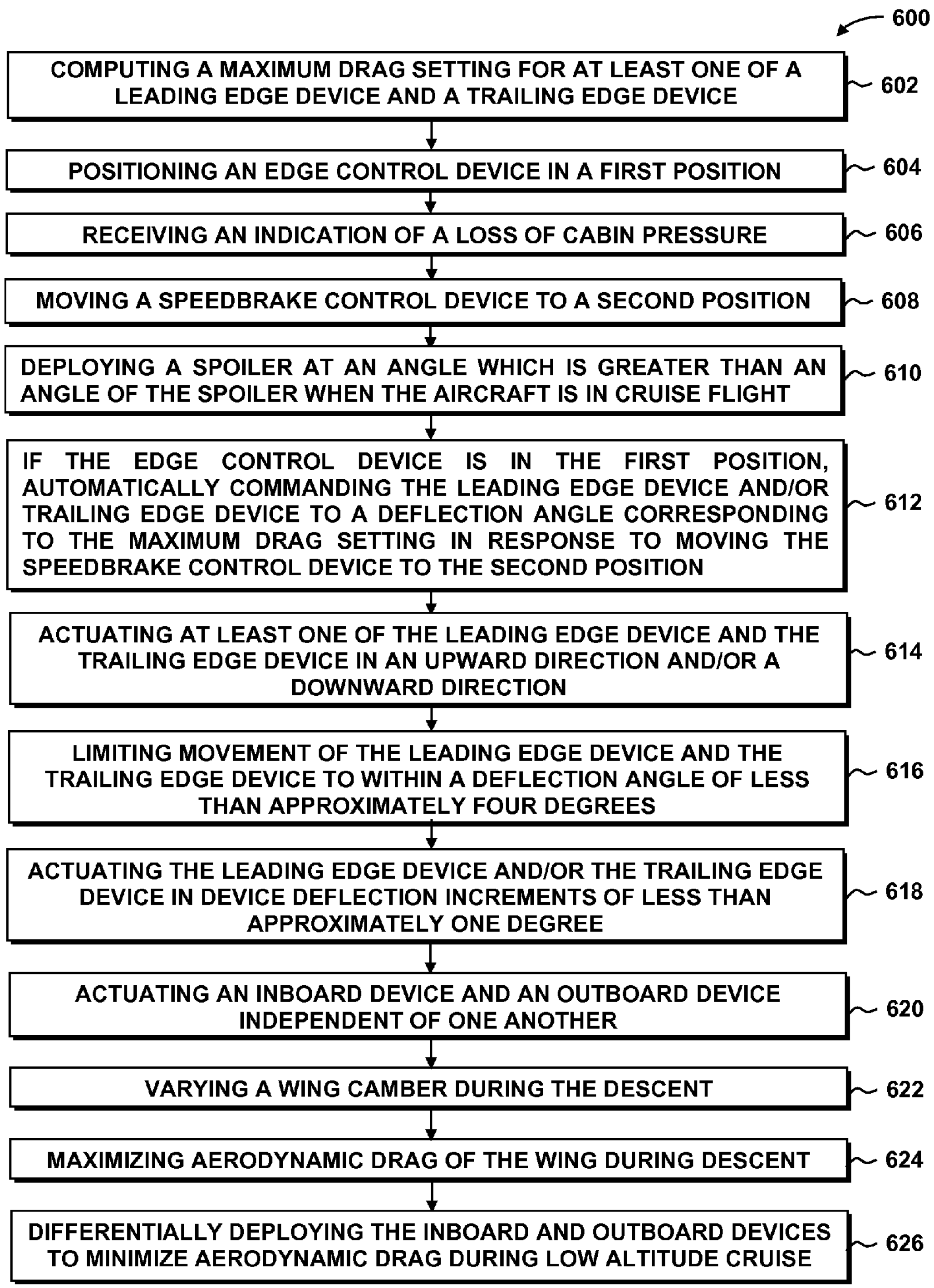
FIG. 20 is an illustration of a flow chart having one or more operations that may be included in a method of increasing the descent rate of an aircraft.

In FIG. 20, shown is a flow chart illustrating one or more operations that may be included in a method of increasing the descent rate of an aircraft 100 such as during an emergency decent. Step 602 of the method may include computing respective settings (e.g., maximum drag settings 174, 264 or settings optimized for drag reduction) for one or more leading edge devices 150 and/or one or more trailing edge devices 240 of an aircraft 100 wing 116. The settings may be computed using a processor based flight control computer 450. As indicated above, the leading edge and trailing edges devices 150, 240 may include inboard devices 144 and outboard devices 146. The method may include computing the maximum drag settings 174, 264 for each one of the inboard devices 144 and/or each one of the outboard devices 146. Step 602 may include computing the maximum drag settings 174, 264 based on aircraft state data 500 including aircraft altitude 510, Mach number 506, aircraft gross weight 502, aircraft center of gravity 504, and other aircraft state parameters. In an embodiment, the method may include continuously updating, using the flight control computer 450, the maximum drag settings 174, 264 based on continuously updated aircraft state data 500 when the flap control lever 454 is in the cruise position 462. In addition, the method may include adjusting, using the device actuation systems 200, 280, the position of the leading edge device 150 and/or the trailing edge device 240 based on the updated aircraft state data 500.

Step 604 of the method 600 of FIG. 20 may include positioning or maintaining the edge control device 453 in a first position such as in a cruise position 462. As indicated above, the edge control system 452 may be communicatively coupled to the flight control computer 450 and may include an edge control device 453 having a plurality of control device positions 458 including a cruise position 462 as shown in FIG. 18. The edge control device 453 may be configured as a flap control lever 454. Each one of the control device positions 458 may represent a setting for the leading edge devices 150 and/or the trailing edge devices 240.

Step 606 of the method 600 of FIG. 20 may include receiving, at the flight control computer 450, an indication of loss of cabin pressure. In an embodiment, an indication may be received at the flight control computer 4450 that the cabin pressure altitude 514 exceeds a predetermined limit. For example, the flight control computer 4450 may receive an indication that the cabin pressure altitude 514 is above 8000 feet when the aircraft is at a cruising altitude of 40,000 feet. The flight crew may also be provided with an indication that the cabin pressure altitude 514 exceeds the predetermined limit at which point supplemental option may be provided to the flight crew such as by the flight crew donning oxygen masks to allow the flight crew to configure the aircraft 100 for an emergency descent.

Step 608 of the method 600 of FIG. 20 may include moving a speedbrake control device 532 into a second position such as into a flight detent 542 as shown in FIG. 18. As indicated above, an indication may be provided to the flight crew and/or to the flight control computer 450 that the cabin pressure exceeds a predetermined limit. Upon receiving such indication, the speedbrake control device 532 may be moved from the down detent 538 (FIG. 18) to the flight detent 542 (e.g., the second position) as part of the procedure for initiating an emergency descent of the aircraft 100. The speedbrake control system 530 may be configured to command a speedbrake actuation system 533 to position the spoilers 290 (FIG. 5) at an augmented deployment angle 550 (FIG. 5) when the speedbrake control device 532 is moved into the flight detent 542.

Step 610 of the method 600 of FIG. 20 may include positioning of deploying, using the speedbrake actuation system 533, one or more spoilers 290 at the augmented deployment angle 550 in response to moving the speedbrake control device 532 into the flight detent 542. As indicated above, the augmented deployment angle 550 may be greater than the normal flight deflection angles 548 of the spoilers 290. The speedbrake control system 530 may command the speedbrake actuation system 533 to position the flight spoilers 291 at the augmented deployment angle 550 when the speedbrake control device 532 is moved into the flight detent 542. The ground spoilers 292 may remain in a retracted position 546 (FIG. 6). However, the emergency descent system 300 may be configured such that both the ground spoilers 292 and the flight spoilers 291 may be positioned in the augmented deployment angle 550 in response to moving the speedbrake control device 532 into the flight detent 542.

Step 612 of the method 600 of FIG. 20 may include automatically commanding, using an edge control system 452, the leading edge device actuation system 200 and/or trailing edge device actuation system 280 to position one or more of the leading edge devices 150 and/or one or more of the trailing edge devices 240 at the respective maximum drag settings 174, 264. Upon receiving the indication at the flight control computer 450 that the cabin pressure altitude 514 exceeds a predetermined limit and following the movement of the speedbrake control device 532 into the flight detent 542, the edge control system 452 may automatically command the leading edge and/or trailing edge devices 150, 240 at the respective maximum drag settings 174, 264.

Step 614 of the method 600 of FIG. 20 may include automatically actuating the leading edge devices 150 and/or the trailing edge devices 240 in an upward direction 166, 256 and/or downward direction 168, 258 relative to a retracted position 158, 248 as shown in FIG. 5. The leading edge devices 150 and/or the trailing edge devices 240 may be differentially deployed to the respective maximum drag settings 174, 264 as computed by the flight control computer 450. Actuation of the leading edge devices 150 and/or the trailing edge devices 240 may vary the wing camber along a spanwise direction 136 and/or along a chordwise direction 138 which may maximize aerodynamic drag of the wing and minimize the L/D of the aircraft 100 resulting in an increase in the descent rate of the aircraft 100.

Step 616 of the method 600 of FIG. 20 may include limiting, using the device actuation system 198, movement of the leading edge devices 150 and/or the trailing edge devices 240 to a predetermined deflection angle 170, 260 when operating the devices in a variable camber mode. For example, the leading edge devices 150 and/or the trailing edge devices 240 may be actuated within a deflection angle 170, 260 of less than approximately four degrees in the upward direction 166, 256 relative to the retracted position 158, 248 and/or within approximately four degrees in the downward direction 168, 258 relative to the retracted position 158, 248.

Step 618 of the method 600 of FIG. 20 may include actuating the leading edge devices 150 and/or the trailing edge devices 240 in deflection increments 172, 262 of less than approximately two (2) degrees, and more preferably within a deflection increment 172, 262 of less than approximately 1 degree such as approximately 0.3 degree. By minimizing the deflection increment 172, 262, each one of the leading edge devices 150 and/or trailing edge devices 240 may be actuated closer to the optimal position for maximum aerodynamic drag of the wing which may increase the descent rate of the aircraft 100.

Step 620 of the method 600 of FIG. 20 may include actuating the leading edge and/or trailing edge inboard devices and outboard devices 144, 146 independent of one another. Advantageously, the emergency decent system 300 may include VCTUs 302 that may operate in conjunction with the PDUs 400 to facilitate independent actuation of the inboard and outboard devices 144, 146. For example, as illustrated in the plots of FIG. 19, the inboard flaps 244 may be deflected to a different position than the outboard flaps 246.

Step 622 of the method 600 of FIG. 20 may include varying the wing camber along a spanwise direction 136 and/or a chordwise direction 138 in response to actuating the inboard devices 144 and the outboard devices 146 independent of one another. As indicated above, differential deployment of the inboard devices 144 and the outboard devices 146 may result in spanwise variation of the wing camber.

Step 624 of the method 600 of FIG. 20 may include maximizing aerodynamic drag of the wings 116 in response to actuating the inboard devices 144 and outboard devices 146 in the variable camber mode. Advantageously, varying the wing camber along a spanwise direction 136 and/or the chordwise direction 138 may maximize aerodynamic drag of the wings 116 to increase the descent rate of the aircraft 100 during an emergency descent.

Following the emergency descent of the aircraft 100 to the lower cruise altitude, Step 626 of the method 600 of FIG. 20 may include deploying the inboard and outboard devices 144, 146 in a manner to minimize aerodynamic drag of the wings 116 during low altitude cruise. For example, during low altitude cruise, the inboard and outboard devices 144, 146 may be differentially deployed to vary the wing camber in a spanwise direction 136 of the wings 116 in the manner described above to minimize aerodynamic drag of the wings 116 to improve the fuel efficiency of the aircraft 100.

Additional modifications and improvements of the present disclosure may be apparent to those of ordinary skill in the art. Thus, the particular combination of parts described and illustrated herein is intended to represent only certain embodiments of the present disclosure and is not intended to serve as limitations of alternative embodiments or devices within the spirit and scope of the disclosure.

What is claimed is:

1. A system for increasing a descent rate of an aircraft, the system comprising:

a flight control computer configured to compute a first setting for a leading edge device and/or a trailing edge device of an aircraft wing having one or more spoilers:

an edge control system communicatively coupled to the flight control computer and including an edge control device having a plurality of control device positions including a cruise position;

a speedbrake control device having a plurality of speedbrake detents including a down detent and a flight detent, the down detent corresponding to a retracted position of the spoilers, the flight detent corresponding to an augmented deployment angle of the spoilers greater than a flight deployment angle of the spoilers, the flight deployment angle of the spoilers assists the ailerons in roll control of the aircraft; and the edge control system configured to automatically command the leading edge device, the trailing edge device, or both, to a deflection angle corresponding to the first setting if the edge control device is in the cruise position and the speedbrake control device is in the flight detent with the spoilers deployed at the augmented deployment angle.

2. The system of claim 1, wherein:

the first setting is selected to increase aerodynamic drag of the aircraft wing and wherein the flight control computer is configured to compute the first setting responsive, in part, to movement of the speedbrake control device to the flight detent.

3. The system of claim 1, wherein:

the edge control system further configured to automatically command the leading edge device, the trailing edge device, or both to the first setting responsive to an indication of loss of cabin pressure.

4. The system of the claim 3, wherein:

the flight control computer is configured to compute the first setting responsive, in part, to the indication of loss of cabin pressure.

5. The system of claim 1, wherein:

the edge control system is communicatively coupled to a device actuation system configured to actuate the leading edge device and/or the trailing edge device in an upward direction and a downward direction relative to a retracted position.

6. The system of claim 1, wherein:

the flight control computer is configured to limit movement of the leading edge device and/or the trailing edge device to within a deflection angle of less than approximately four degrees in at least one of an upward direction and a downward direction relative to a retracted position.

7. The system of claim 1, wherein:

the edge control system is communicatively coupled to a device actuation system configured to actuate at least one of the leading edge device and trailing edge device in device deflection increments of less than approximately one degree.

8. The system of claim 1, wherein:

the flight control computer is configured to compute the first setting based on aircraft state data including aircraft gross weight and aircraft altitude.

9. The system of claim 1, wherein:

at least one of the leading edge device or trailing edge device includes an inboard device and an outboard device; and the edge control system is communicatively coupled to a device actuation system configured to actuate the inboard device and the outboard device independent of one another.

10. An aircraft, comprising:

a pair of wings, each including a leading edge device, a trailing edges device, or both, and further including one or more spoilers: an emergency descent system including:

a flight control computer configured to receive an indication of loss of cabin pressure and compute a first setting for the leading edge device and/or the trailing edge device;

an edge control system communicatively coupled to the flight control computer and operable to control the leading edge device and/or the trailing edges device;

a speedbrake control device having a plurality of speedbrake detents including a down detent and a flight detent, the down detent corresponding to a retracted position of the spoilers, the flight detent corresponding to an augmented deployment angle of the spoilers greater than a flight deployment angle of the spoilers, the flight deployment angle of the spoilers assists the ailerons in roll control of the aircraft: and wherein the emergency descent system is configured to automatically command the leading edge device and/or the trailing edge device to a deflection angle corresponding to the first setting responsive, at least in part, to the indication of loss of cabin pressure and selection, with the speedbrake control device, of the flight detent with the spoilers deployed at the augmented deployment angle.

11. The aircraft of claim 10, wherein:

the first setting is selected to increase aerodynamic drag of the wings, the flight control computer further configured to receive an indication of low cruise altitude and compute a second setting selected to reduce aerodynamic drag of the wings.

12. The aircraft of claim 11, wherein:

the deflection angle corresponding to the first setting or a deflection angle corresponding to the second setting is smaller than 5 degrees.

* * * * *